United States Patent
Cote et al.

(10) Patent No.: US 10,499,071 B2
(45) Date of Patent: *Dec. 3, 2019

(54) DYNAMIC BIT RATE ADAPTATION OVER BANDWIDTH VARYING CONNECTION

(71) Applicant: VANTRIX CORPORATION, Montreal (CA)

(72) Inventors: Sebastien Cote, Montreal (CA); Jean-Noel Krause, Terrebonne (CA)

(73) Assignee: VANTRIX CORPORATION, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,868

(22) Filed: Sep. 14, 2015

(65) Prior Publication Data

US 2016/0007033 A1    Jan. 7, 2016

Related U.S. Application Data

(63) Continuation of application No. 13/210,652, filed on Aug. 16, 2011, now Pat. No. 9,137,551.

(51) Int. Cl.
*H04N 19/40* (2014.01)
*H04N 19/152* (2014.01)
(Continued)

(52) U.S. Cl.
CPC ........... *H04N 19/40* (2014.11); *H04L 65/607* (2013.01); *H04N 19/146* (2014.11);
(Continued)

(58) Field of Classification Search
CPC .. H04N 7/50; H04N 7/26271; H04N 7/26244; H04N 9/8042; H04N 5/85; H04N 7/26186; H04N 19/152; H04N 19/40
(Continued)

(56) References Cited

U.S. PATENT DOCUMENTS

| 4,542,525 A | 9/1985 | Hopf |
| 4,893,197 A | 1/1990 | Howells et al. |

(Continued)

FOREIGN PATENT DOCUMENTS

| CA | 2759880 | 9/2010 |
| CN | 102123303 | 7/2011 |

(Continued)

OTHER PUBLICATIONS

UCSD, CSE 228 Lecture 7, available at https://cseweb.ucsd.edu/classes/sp03/cse228/Lecture_7.html, pub. 2003.*

(Continued)

*Primary Examiner* — Jeremiah C Hallenbeck-Huber
(74) *Attorney, Agent, or Firm* — IP-MEX INC.; Victoria Donnelly

(57) ABSTRACT

Audio and video streams of a media file are transcoded just-in-time by keeping the transcoding process synchronized to a wall clock. The transcoding is initially configured slightly faster than real-time. The transcoded frames are pushed from the transcoder through a variable bandwidth connection as soon as they are transcoded. Transcoding is then monitored periodically to assess the bandwidth that was available during the transmission of a transcoded buffer. Two time intervals are measured: a buffer interval which is the difference in the transcoded buffer timestamps of the previous two transmissions, and a clock interval corresponding to the real time transmission time of the last transcoded buffer. If a significant difference is observed, the transcoder bit rate is adjusted by a factor that is derived from that difference.

20 Claims, 13 Drawing Sheets

(51) Int. Cl.
  *H04N 21/234* (2011.01)
  *H04N 21/2343* (2011.01)
  *H04N 21/24* (2011.01)
  *H04N 21/2662* (2011.01)
  *H04N 21/414* (2011.01)
  *H04N 21/643* (2011.01)
  *H04N 21/845* (2011.01)
  *H04N 19/146* (2014.01)
  *H04L 29/06* (2006.01)

(52) U.S. Cl.
  CPC ....... *H04N 19/152* (2014.11); *H04N 21/2343* (2013.01); *H04N 21/23406* (2013.01); *H04N 21/2402* (2013.01); *H04N 21/2662* (2013.01); *H04N 21/41407* (2013.01); *H04N 21/64322* (2013.01); *H04N 21/8456* (2013.01)

(58) Field of Classification Search
  USPC ............... 375/240.01, E7.159; 348/419.1
  See application file for complete search history.

(56) References Cited

U.S. PATENT DOCUMENTS

| | | | |
|---|---|---|---|
| 5,371,741 | A | 12/1994 | Entani |
| 6,208,620 | B1 | 3/2001 | Sen et al. |
| 6,400,954 | B1 | 6/2002 | Khan |
| 7,041,941 | B2 | 5/2006 | Faries et al. |
| 7,085,268 | B2 | 8/2006 | Fukuda |
| 7,260,826 | B2 | 8/2007 | Zhang et al. |
| 7,299,291 | B1 | 11/2007 | Shaw |
| 7,342,880 | B2 | 3/2008 | Hiromasa |
| 7,400,588 | B2 | 7/2008 | Izzat et al. |
| 7,444,425 | B2 | 10/2008 | Lehmann et al. |
| 7,609,645 | B2 | 10/2009 | Miyaji et al. |
| 7,710,906 | B2 | 5/2010 | Kawada |
| 7,720,983 | B2 | 5/2010 | Klemets et al. |
| 7,843,824 | B2 | 11/2010 | Wu |
| 7,844,725 | B2 | 11/2010 | Labonte et al. |
| 8,014,470 | B2 | 9/2011 | Lee et al. |
| 8,050,211 | B2 | 11/2011 | Nakata |
| 8,139,487 | B2 | 3/2012 | Kasheff et al. |
| 2002/0164024 | A1 | 11/2002 | Arakawa et al. |
| 2002/0173315 | A1 | 11/2002 | Chmaytelli |
| 2003/0002609 | A1 | 1/2003 | Faller |
| 2003/0229693 | A1 | 12/2003 | Mahlik et al. |
| 2004/0098748 | A1 | 5/2004 | Bo et al. |
| 2004/0146111 | A1 | 7/2004 | Dutey et al. |
| 2004/0179506 | A1 | 9/2004 | Padovani et al. |
| 2005/0021821 | A1 | 1/2005 | Turnbull et al. |
| 2005/0060364 | A1 | 3/2005 | Kushwaha et al. |
| 2005/0078193 | A1 | 4/2005 | Ing et al. |
| 2005/0105604 | A1 | 5/2005 | Ito et al. |
| 2005/0268237 | A1 | 12/2005 | Crane |
| 2006/0050807 | A1 | 3/2006 | Kroeger |
| 2006/0109915 | A1 | 5/2006 | Unger |
| 2007/0091815 | A1 | 4/2007 | Tinnakornsrisuphap |
| 2007/0115918 | A1 | 5/2007 | Bodin et al. |
| 2007/0249401 | A1 | 10/2007 | Kim |
| 2008/0052414 | A1 | 2/2008 | Panigrahi |
| 2008/0062322 | A1 | 3/2008 | Dey |
| 2008/0075163 | A1 | 3/2008 | Brydon et al. |
| 2008/0086570 | A1 | 4/2008 | Dey |
| 2008/0107173 | A1* | 5/2008 | van Beek ......... H04N 21/23406 375/240.02 |
| 2008/0117887 | A1 | 5/2008 | Joung et al. |
| 2008/0133766 | A1 | 6/2008 | Luo |
| 2008/0146241 | A1 | 6/2008 | Das et al. |
| 2008/0232469 | A1 | 9/2008 | Nie |
| 2008/0300025 | A1 | 12/2008 | Song et al. |
| 2009/0103607 | A1 | 4/2009 | Bajpai |
| 2010/0020717 | A1 | 1/2010 | McGregor et al. |
| 2010/0023635 | A1 | 1/2010 | Labonte et al. |
| 2010/0178949 | A1 | 7/2010 | Jang et al. |
| 2010/0189183 | A1 | 7/2010 | Gu et al. |
| 2011/0007834 | A1 | 1/2011 | Hoshino et al. |
| 2011/0131335 | A1 | 6/2011 | Spaltro et al. |
| 2012/0016993 | A1 | 1/2012 | Kisel et al. |

FOREIGN PATENT DOCUMENTS

| | | |
|---|---|---|
| EP | 1372304 | 12/2003 |
| EP | 1821442 | 8/2005 |
| EP | 1821442 | 8/2007 |
| JP | 2003-46976 | 2/2003 |
| JP | 2004193850 | 7/2004 |
| JP | 2005-217199 | 8/2005 |
| JP | 2007-036681 | 2/2007 |
| JP | 2009-005193 | 1/2009 |
| WO | WO 2004/056028 | 7/2004 |
| WO | WO 2004/072766 | 8/2004 |
| WO | WO 2005/122025 | 12/2005 |
| WO | WO 2006/086691 | 8/2006 |
| WO | WO 2007/027891 | 3/2007 |
| WO | WO2007/027891 | 3/2007 |
| WO | 2007051156 | 5/2007 |

OTHER PUBLICATIONS

Intel Integrated Performance Primitives 6.0—Code Samples, published at http://software.intel.com/en-us/articles/, May 2009.

"Ortive Stream Shaper" brochure, published by Ortive Wireless, Inc. at www.ortivawireless.com, California, USA, prior to Jul. 25, 2008.

"How will you deliver high-quality video to millions of media-hungry mobile subscriber?", published by Ortive Wireless, Inc. at www.ortivawireless.com, California, USA, prior to Jul. 25, 2008.

R. Braden "RFC 1122-Requirement for Internet Hosts-Communication Layers" Oct. 1989, pp. 1-116.

Chang et al., "Efficient segment-based video transcoding proxy for mobile multimedia services", Journal of Systems Architecture, vol. 53, No. 11, Aug. 14, 2007, pp. 833-845.

Hiromoto et al. "Dynamic rate control for media streaming in high-speed mobile networks", (DICOMO2008) Symposium Information Processing Society Symposium Series, Japan, Jul. 2, 2008, p. 1167-1176.

* cited by examiner

DYNAMIC BIT RATE ADAPTATION OVER BANDWIDTH VARYING CONNECTION

RELATED APPLICATIONS

The present application is Continuation of U.S. application Ser. No. 13/210,652 filed on Aug. 16, 2011, which has been granted as U.S. Pat. No. 9,137,551 on Sep. 15, 2015, entire contents of which are incorporated herein by reference.

FIELD OF THE INVENTION

The present invention relates to the transmission of real time media.

BACKGROUND OF THE INVENTION

FIG. 1 shows a Media Transmission System 100 of the prior art, including a Media Server Subsystem 102 which is connected to Mobile Units 104 over a Network 106, for example the Internet.

Each Mobile Unit 104 may, for example, be a smart phone or a laptop computer equipped to set up a media session.

The Media Server Subsystem 102 may include a Media Server computing device 108 for generating the media file, an Internet Content Adaptation Protocol (ICAP) Server computing device 110 for processing media files, and a Hypertext Transfer Protocol (HTTP) Proxy Server computing device 112 for handling requests from the Mobile Units, or terminals, 104 and to perform other functions.

A media session may be requested by the Mobile Unit 104. The purpose of the media session is to send a stream of media packets (a media file) from the Media Server Subsystem 102 to the Mobile Unit 104.

When the bandwidth of the connection over the Network 106 between a requesting Mobile Unit 104 and the Media Server Subsystem 102 is lower than the bandwidth required to send the original media file in real time, the media file may then be adapted to the lower bandwidth by equipment located in the ICAP Server 110 which is typically an adjunct of the HTTP Proxy Server 112.

The bandwidth of the connection over the Network 106 may also vary in time which poses additional problems for the adaptation of the media file.

Accordingly, a method and system to improve the bandwidth adaptation of media files for transmission over connections with varying bandwidth are required.

SUMMARY OF THE INVENTION

It is an object of the present invention to provide a method and system for encoding a media file or part thereof for transmission in real time over a varying bandwidth link to a mobile unit.

According to one aspect of the invention, there is provided a method for encoding a media file or part thereof for transmission in real time over a varying bandwidth link to a mobile unit, comprising:
employing at least one processor for:
(i) encoding one or more fragments of the media file into transcoded media fragments to form a stream fragment;
(ii) determining an estimated transmit time of a previously formed stream fragment, the estimated transmit time being a time interval required for said previously formed stream fragment to be conveyed from a transcoder and consumed by the varying bandwidth link; and
(iii) adjusting a current encoding rate of the transcoded media fragments as a function of the estimated transmit time.

In the method described above, the step (i) comprises:
encoding at least a first fragment of the media file into corresponding first transcoded media fragment at an initial encoding rate; and
setting the current encoding rate equal to the initial encoding rate;
and the step (iii) comprises encoding subsequent fragments of the media file into corresponding transcoded media fragments at the adjusted current encoding rate.

In the method described above, the step (iii) further comprises adjusting the current encoding rate as a function of an estimated display time of said stream fragment at the mobile unit, the estimated display time being derived from timestamps associated with two previously formed stream fragments.

The step (iii) further comprises adjusting the current encoding rate as a function of the current encoding rate.

In one embodiment of the invention, the function is a product of the current encoding rate and an adjustment factor which depends on the estimated display time and the estimated transmit time.

Conveniently, the adjustment factor is the estimated display time divided by the estimated transmit time.

The method further comprises transmitting the transcoded media fragments to the mobile unit for display.

In the method described above, the adjusting of the current encoding rate may be performed from time to time. For example, the adjusting may be performed periodically.

In an embodiment of the invention, the step (ii) further comprises estimating the estimated transmit time as a current clock interval between a current time and a previous time of the last encoding, and the step (iii) further comprises:
determining a current buffer interval representing an estimated display time of a previous stream fragment at the mobile unit, said current buffer interval being derived from timestamps embedded in two previously formed stream fragments;
comparing the current clock interval with the current buffer interval; and
adjusting the current encoding rate as a function of the current clock interval and the current buffer interval.

Conveniently, the two previously formed stream fragments comprise the last two stream fragments.

In the method described above, the adjusting comprises adjusting the current encoding rate provided the current clock interval differs from the current buffer interval by a predetermined amount.

For example, the step (iii) may comprise adjusting the current encoding rate after the current clock interval of N seconds has elapsed. In the embodiments of the invention, N is in a range between 2 and 5 seconds, for example N=3 seconds.

The adjusting the current encoding rate as a function of the current clock interval and the current buffer interval may be performed as follows:
increasing the current encoding rate by a first incremental value computed from a first relative difference between the current buffer interval and the current clock interval, provided the first relative difference exceeds a first predetermined threshold TH1; and decreasing the current encoding rate by a second incremental value computed from a second relative difference between the current clock interval and the current buffer interval, provided the second relative difference exceeds a second predetermined threshold TH2.

Conveniently, TH1 may be chosen to be at least 0.05, and TH2 to be at least 0.02.

In the method described above, the first incremental value is equal to the first relative difference divided by a first attenuation factor AF1, and the second incremental value is equal to the second relative difference divided by a second attenuation factor AF2, the first and second attenuation factors AF1 and AF2 being chosen so as to prevent excessive or rapid over-adjusting of the current encoding rate and to ensure stability of the adjusting step.

In another embodiment of the invention, the step (iii) comprises adjusting the current encoding rate only if a pause in the transmission of the transcoded media fragments is not detected.

In said another embodiment of the invention, the step (iii) further comprises detecting the pause, comprising:
  computing a clock interval average as an average of past current clock intervals since the encoding of the media file has begun, a current clock interval being measured between a current time and a previous time of the last encoding; and
  determining that the pause is detected provided the current clock interval exceeds the clock interval average by a predetermined margin XC.

The method described above further comprises determining that the pause is detected provided:
  at least two current clock intervals have occurred; and
  a number of times the pause has already been detected is less than a maximum number (MP) of detected pauses.

The method further comprises determining that a pause is detected provided the current clock interval exceeds the clock interval average multiplied by a factor M. The method further comprises replacing the current clock interval with the average clock interval provided the pause is detected. In the embodiments of the invention, MP is 3, XC is 1, and M is 4.

According to another aspect of the invention, there is provided a media processing system for encoding a media file or part thereof for transmission in real time over a varying bandwidth link to a mobile unit, comprising:
  a processor and a non-transitory computer readable storage medium having computer readable instructions stored thereon for execution by the processor, forming:
  a transcoder configured to transcode one ore more fragments of the media file into transcoded media fragments to form a stream fragment; and
  a dynamic bit rate adapter configured to adjust a current encoding bit rate of the transcoder as a function of an estimated transmit time of a previously formed stream fragment, the estimated transmit time being a time interval required for said previously formed media fragment to be conveyed from the transcoder and consumed by the varying bandwidth link.

In the media processing system described above, the dynamic bit rate adapter is further configured to adjust the current encoding rate as a function of an estimated display time of said stream fragment at the mobile unit, the estimated display time being derived from timestamps associated with two previously formed stream fragments.

The media processing system further comprises a transcoder buffer adapted to forward transcoded media fragments to a network, and to send timestamps associated with at least some of the transcoded media fragments to the dynamic bit rate adapter.

The dynamic bit rate adapter comprises:
  a wall clock module for tracking the current time; and
  a quality of service (QoS) adjuster configured to process the current time and the timestamps into a QoS value to be sent to the transcoder for adjusting the encoding bit rate of the transcoder from time to time.

In the media processing system described above, the dynamic bit rate adapter further comprises a pause detector configured to detect a cessation of transmission of the transcoded media fragments and to inhibit the dynamic bit rate adapter from adjusting the current encoding rate provided the cessation has been detected.

The dynamic bit rate adapter is further configured to adjust the current encoding rate as a function of the current encoding rate.

In one embodiment of the invention, the dynamic bit rate adapter is further configured to estimate the estimated transmit time as a current clock interval between a current time and a previous time of the last encoding.

The dynamic bit rate adapter is further configured to:
  determine a current buffer interval representing an estimated display time of a previous stream fragment at the mobile unit, said current buffer interval being derived from timestamps embedded in two previously formed stream fragments;
  compare the current clock interval with the current buffer interval; and
  adjust the current encoding rate as a function of the current clock interval and the current buffer interval.

The dynamic bit rate adapter is yet further configured to adjust the current encoding rate provided the current clock interval differs from the current buffer interval by a predetermined amount.

According to yet another aspect of the invention, there is provided a method for encoding a media file or part thereof for transmission in real time over a varying bandwidth link to a mobile unit, comprising:
employing at least one processor for:
  (a) encoding at least a first fragment of the media file into a transcoded media fragment at a current encoding rate equal to an initial encoding rate to form a stream fragment, and transmitting the stream fragment;
  (b) reevaluating the current encoding rate into a new encoding rate based on an estimated transmit time of a previously transmitted stream fragment, the estimated transmit time being a time interval required for said stream fragment to be consumed by the varying bandwidth link;
  (c) setting the current encoding rate to be equal to the new encoding rate;
  (d) encoding another fragment of the media file into a transcoded media fragment at the current encoding rate; and
  (e) repeating the steps (b) to (d) until the media file or the part thereof has been completely transcoded.

In the method described above, the step (b) comprises estimating the estimated transmit time as a current clock interval between a current time and a previous time of the last reevaluating.

The step (b) further comprises:
  determining a current buffer interval representing an estimated display time of the last stream fragment at the mobile unit, the current buffer interval being derived from timestamps embedded in at least some of the transcoded media fragments of the last and the previous stream fragments;

comparing the current clock interval with the current buffer interval; and modifying the current encoding rate provided the current clock interval differs from the current buffer interval.

In the method described above, the current encoding rate is modified as a function of the current clock interval and the current buffer interval.

In the method described above, the step (b) further comprises computing the new encoding rate as a function of the current encoding rate, and an estimated display time of the last stream fragment at the mobile unit, the estimated display time being a function of timestamps embedded in at least some of the transcoded media fragments of the last and the previous stream fragments.

For example, the function may be a product of the current encoding rate and an adjustment factor depending on the estimated display time and the estimated transmit time.

In the embodiments of the invention, the step (b) comprises reevaluating the current encoding rate only after the current clock interval of N seconds has elapsed.

In an alternative embodiment of the invention, the step (b) further comprises detecting a cessation of transmission of the transcoded media fragments, and suppressing the adjusting of the current encoding rate provided the cessation has been detected.

Thus, an improved method and system for encoding a media file or part thereof for transmission in real time over a varying bandwidth link to a mobile unit have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 1:
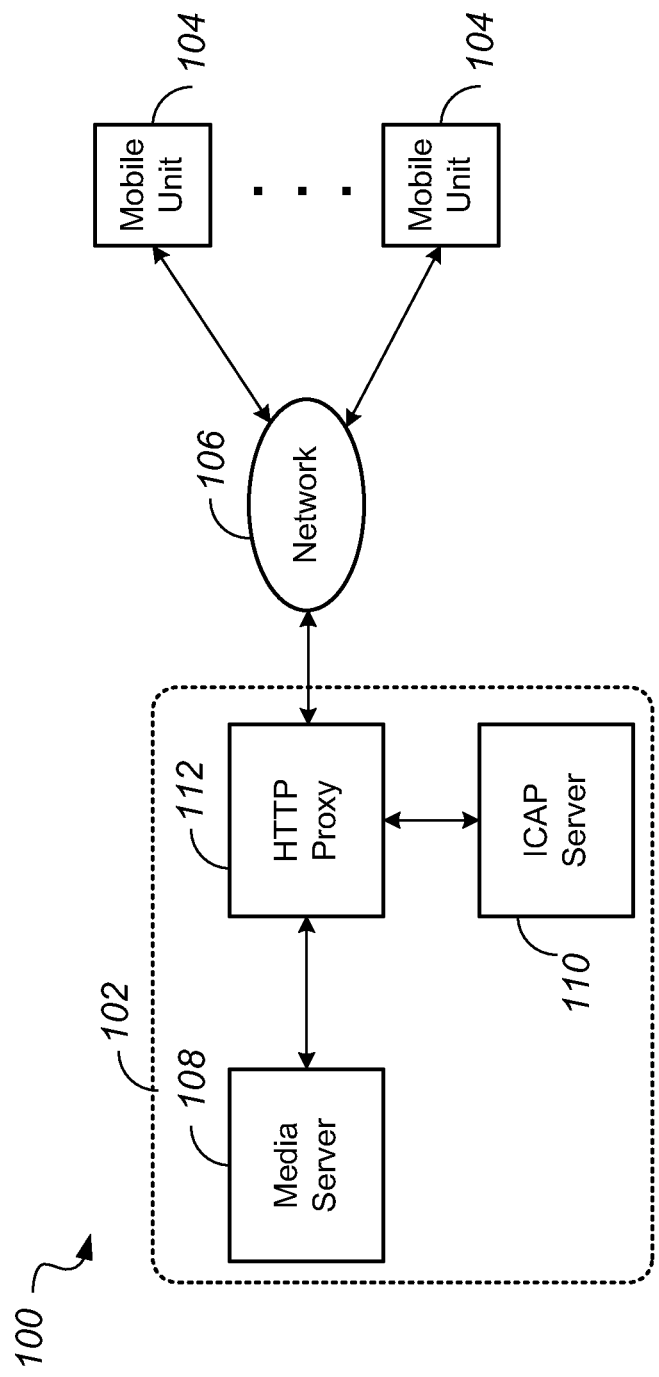
FIG. 1 shows a Media Transmission System 100 of the prior art.

Embodiments of the present invention aim to improve the user experience in HTTP multimedia delivery over networks for which the bandwidth varies over time. This is done by dynamically changing the encoding rate of a multimedia file to match the available bandwidth.

The solution may be implemented on the ICAP protocol, but the ultimate delivery to the device is based on HTTP, and the solution applies equally to both protocols.

When users are streaming video over mobile networks, the network often does not have enough bandwidth available to provide near real-time delivery. As a result, the quality of the viewing experience is poor because the video stalls on the end device.

To avoid this problem, the encoding rate of the media is dynamically adapted by embodiments of the present invention, by adjusting the current encoding rate from time to time to approximately match the available bandwidth. When using the HTTP protocol for streaming, the client application does not send any feedback to the server, and the underlying Transmission Control Protocol (TCP) connection information cannot be used reliably.

Prior solutions have used the Real Time Streaming Protocol (RTSP) as a control protocol with the Real-time Transport Protocol (RTP) over User Datagram Protocol (UDP) for data delivery. When using these protocols, the video player sends feedback from the mobile unit to the server a few times every second. This feedback also includes information about network impairment (packets loss, jitter, etc), and allows the encoding rate to be adjusted automatically. U.S. Pat. No. 7,844,725, entitled "DATA STREAMING THROUGH TIME-VARYING TRANSPORT MEDIA", granted to Francis R. Labonte, et al., entire contents of which are incorporated herein by reference, discloses a method for data streaming over a time-varying connection.

Using HTTP instead of a combination of RTSP and RTP is desirable because HTTP is an omnipresent protocol for the web. It is used to transfer almost any kind of data. As HTTP support is a requirement for both web clients and servers, transferring video over HTTP is a natural fit to maximize interoperability between clients and servers without using a parallel protocol such as RTSP/RTP for example which only serves a much more specific purpose. For a similar example, consider file downloads. File Transfer Protocol (FTP) was designed especially for that purpose but today, a very high percentage of files on the web are transferred over HTTP instead of FTP.

Another consideration is interoperability of equipments. HTTP is widely interoperable. It has countless implementations on both the server side and the client side. It has Apache as a de facto reference implementation that every client can interoperate with. RTSP on the other hand suffers from non-compliance with the standard in many commercial implementations (see also an article regarding HTTP versus RTSP/RTP at http://www.remlab.net/op/vod.shtml).

When using HTTP in audio and video streaming however, the only information available about the delivery comes from the TCP connection, which is managed at the Operating System layer, and which is not aware of multimedia. Also, proxy servers are often found between the multimedia server and the client. These proxies handle the connection with the client device, and they establish their own connection. The embodiments of the present invention enable efficient audio and video streaming over an HTTP connection without requiring explicit feedback from the receiving client to the streaming server.

Figure 2:
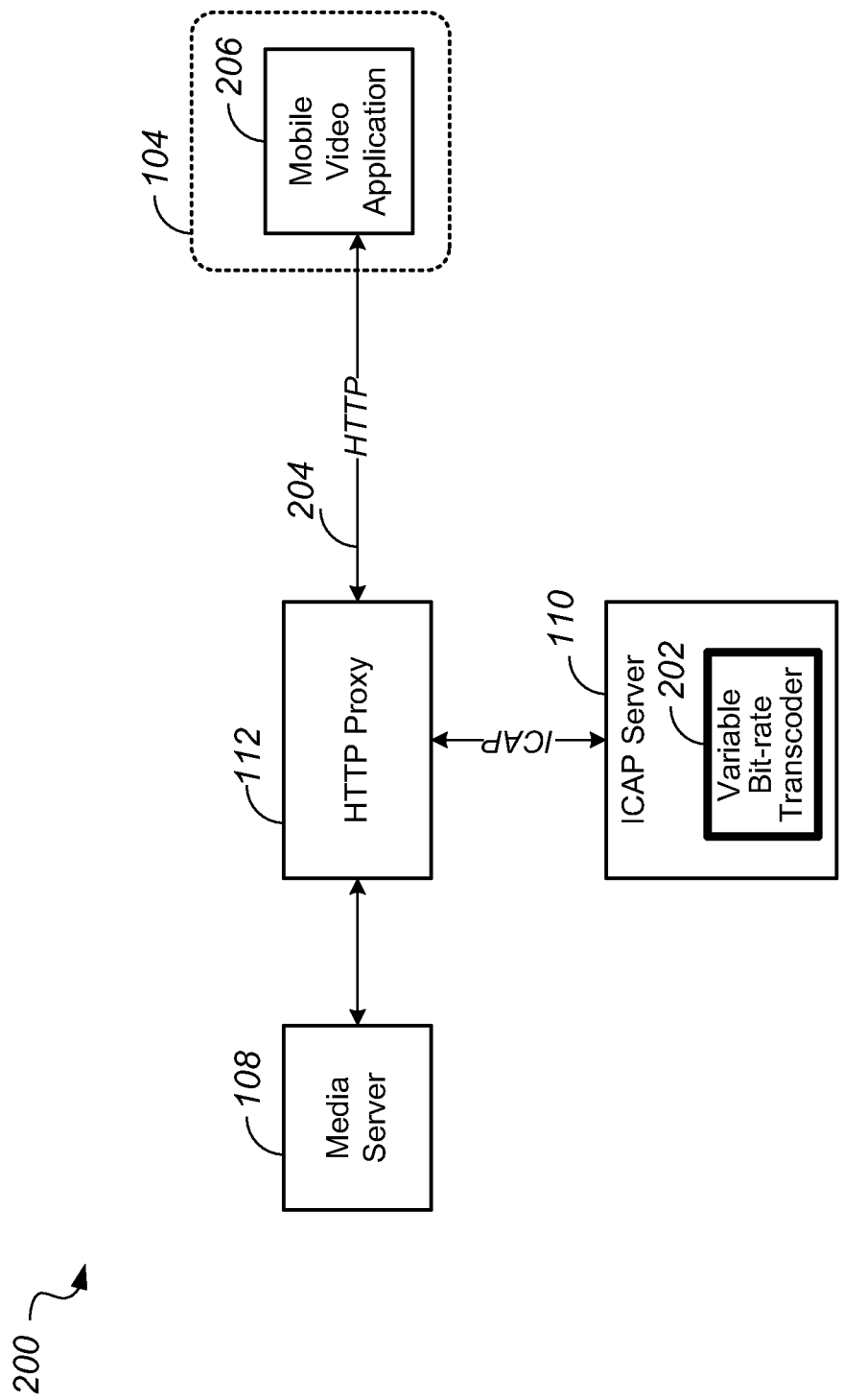
FIG. 2 shows a Media Delivery System 200 according to an embodiment of the invention, including a Variable Bit Rate Transcoder 202.

FIG. 2 shows a Media Delivery System 200 according to an embodiment of the invention, which includes a Variable Bit Rate Transcoder 202 providing a dynamic bit rate adaptation for media files transmitted from the Media Server computing device 108 over a Variable Bandwidth Link 204 to a Mobile Video Application 206 in the Mobile Unit 104. Preferably, the Variable Bandwidth Link 204 to the Mobile Unit 104 provides an HTTP connection to the HTTP Proxy Server computing device 112. In FIG. 2 we show the HTTP link 204 to the mobile unit 104. This link can be a direct link, for example in the laboratory, or go through the Internet, including a wireless drop to the mobile unit 104 itself.

The mobile Unit 104 is a device, for example a smart phone, laptop, a tablet, or another computer-like device equipped to setup a media session.

The mobile video application 206 comprises computer readable instructions stored in a computer readable storage medium such as memory for execution by a processor.

In one embodiment, the Variable Bit Rate Transcoder 202 comprises computer readable instructions stored in a computer readable storage medium such as memory for execution by a processor. Alternatively, the Variable Bit Rate Transcoder 202 may be implemented in firmware.

The Variable Bit Rate Transcoder 202 is shown embedded in the ICAP Server 110 which is coupled to the HTTP Proxy Server 112 over an ICAP link, it is understood that the Variable Bit Rate Transcoder 202 can also alternatively be embedded in the HTTP Proxy Server 112, or in the Media Server 108.

Figure 3:
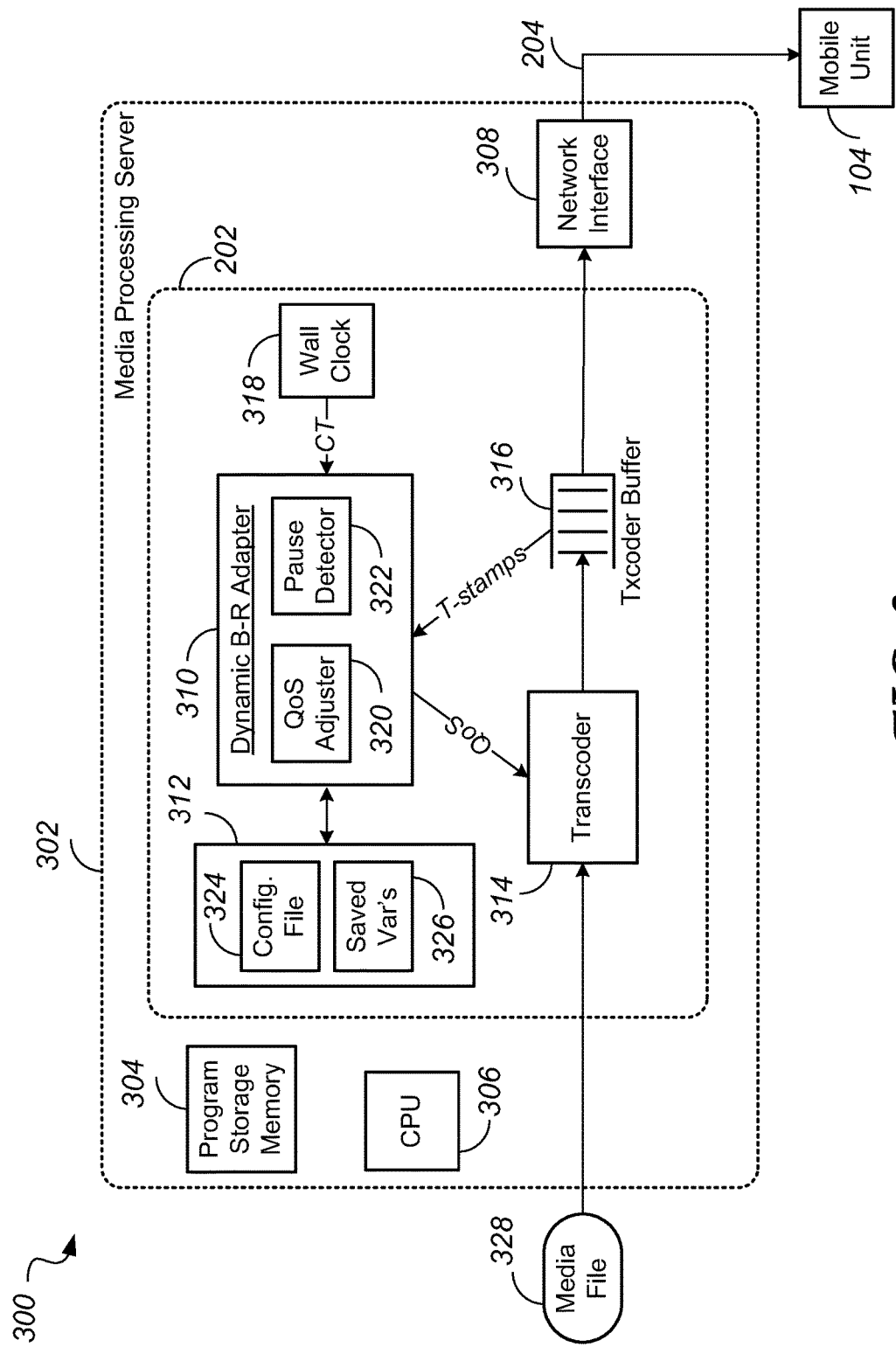
FIG. 3 shows a simplified block diagram of a Variable Bit Rate Transcoder System 300, including the Variable Bit Rate Transcoder 202 of FIG. 2.

FIG. 3 shows a simplified block diagram of a Variable Bit Rate Transcoder System 300, including a Media Processing Server 302 which is a computing device comprising at a minimum a Program Storage Memory 304, a CPU 306, and a Network Interface 308, as well as the Variable Bit Rate Transcoder 202 of FIG. 2. The Variable Bit Rate Transcoder 202 is preferably realized as a software module including instructions stored in the Program Storage Memory 304 and executed by the CPU 306. The Media Processing Server 302 may represent the Media Server 108, the Internet Content Adaptation Protocol (ICAP) Server 108, or the Hypertext Transfer Protocol (HTTP) Proxy Server 112 in various embodiments of the invention.

The Variable Bit Rate Transcoder 202 comprises a Dynamic Bit Rate Adapter 310, a Session Variables storage module 312, a Transcoder 314, a Transcoder Buffer 316, and a Wall Clock 318. The Dynamic Bit Rate Adapter 310 includes a QoS Adjuster module 320 and a Pause Detector module 322. The Session Variables storage module 312 includes a Configuration File 324 and a Saved Variables storage 326. Thus, in one embodiment of the invention, the above mentioned modules 310, 312, 314, 316, 318, 320, 322 and 324 of the Variable Bit Rate Transcoder 202 comprise computer readable instructions stored in a computer memory for execution by a processor.

The network interface 308 includes both hardware (physical interface), and software (protocols).

The CPU 306 runs an operating system (OS, not shown), for example Linux, which includes the protocols.

The OS also provides a timing service based on a clock chip that is available in a computer, from which the current time (CT) is derived. This is represented in the Wall Clock 318 module. The DBRA 310 module reads the time (wall clock time) from the OS software (kernel) when required, but Wall Clock 318 module may embellish it, for example scale it or offset it and keep a local "wall clock" variable which may count time from zero when transmission of transcoded media fragments starts, and thus makes the current time (CT) available to the DBRA 310.

In operation, the Transcoder 314 receives a Media File 328, transcodes or encodes the Media File 328 to a bit rate suitable for transmission to the Mobile Unit 104 through the Transcoder Buffer 316, the Network Interface 308, and over the Variable Bandwidth Link 204, in which a function of the Network Interface 308 is to implement a reliable transmission control protocol (TCP) that underlies the application protocol such as HTTP.

The time interval used in transmitting one or more transcoded media fragments, to be also referred to as a stream fragment, depends on the bandwidth that is available on the Variable Bandwidth Link 204 and is under the control of the reliable transmission control protocol (TCP). An approximate time used in the transmission of a stream fragment can then be calculated by observing the instances of time when successive stream fragments leave the Transcoder Buffer 316, the time values being obtained from an output of the Wall Clock 318. The calculated transmit time is termed an "estimated transmit time".

To clarify the expression "transmit time" or "estimated transmit time", it should be noted that this is effectively the period of time needed for the transcoded fragments to be serially transmitted at the bit rate of the Variable Bandwidth Link 204, i.e the time the transcoded fragments occupy while leaving the Variable Bit Rate Transcoder 202. It is not the delay time between the Variable Bit Rate Transcoder 202 and the Mobile Unit 104, which is not known and is irrelevant to the operation of the embodiment of the invention.

The estimated transmit time is the time interval required for one or more previous stream fragments to be conveyed from the transcoder and consumed by the varying bandwidth link.

It is understood that in a variation of the preferred embodiment, the estimated transmit time may also be derived from earlier stream fragments which are not immediately previous to the time of the estimating.

The Dynamic Bit Rate Adapter 310, monitors timestamps from the Transcoder Buffer 316 and, using the Wall Clock and the Session Variables 312, executes algorithms for estimating the bandwidth available on the Variable Bandwidth Link 204, and adjusting a current Quality of Service (QoS) value accordingly. The Transcoder 314 then applies the current QoS value to adjust the current encoding bit rate accordingly. In the following, the terms "Transcoding bit rate", "encoding rate", and "QoS value" are used interchangeably in the present application. "Transcoding bit rate" and "encoding rate" directly refer to the resulting bit rate from the transcoding operation of the Transcoder 314; "QoS value" is a parameter inputted to the Transcoder 314 for controlling the encoding rate, thus indirectly specifying the encoding rate.

When a session is initiated, session parameters including an initial QoS value are determined and stored in the Configuration File 324.

A new QoS value is calculated periodically in the QoS Adjuster module 320 which uses a bit rate adaptation function to compare the estimated transmit time, the time it took for a stream fragment (comprising one or more transcoded fragments) to be transmitted from the Variable Bit Rate Transcoder 202 transcoder. The estimated transmit time is also referred to as a current clock interval, and the estimated display time is the time needed for displaying the same stream fragment in the Mobile Unit 104, as indicated by the timestamps that are embedded in the stream. The estimated display time, also referred to as a current buffer interval, is the time implicitly specified in the timestamps of the stream fragment for use by a display function of the mobile unit in displaying the stream fragment in real time. Previous observed and computed values, such as the wall clock time and the timestamp at the beginning of sending the stream fragment, as well as values needed in calculating interval averages, are kept in the Saved Variables storage 326. In one embodiment of the invention, the current clock interval is equal to an adaptation refresh interval of at least three seconds.

It is understood that the bit rate available on the link 204 is not directly observable, nor is any information about the occupancy of any buffer in the Mobile Unit 104 available. However while receiving, buffering, and displaying the video stream in real time as dictated by the embedded time stamps, the Mobile Unit 104 will automatically receive additional stream fragments from time to time. In this the transmission rate is governed for example by the underlying network protocol (TCP). As long as the Variable Bit Rate Transcoder 202 is able to send each such fragment in real time as measured by the wall clock time, the link bit rate is sufficient. But if the bit rate was insufficient, this would be detected in the Variable Bit Rate Transcoder 202 because the previous stream fragment could not be sent in a short enough time. While the Mobile Unit 104 is assumed to have a receive buffer to smooth bit rate variations, this receive buffer would starve if the link bit rate was insufficient over a long time. To avoid this, the Variable Bit Rate Transcoder 202 then need to reduce the encoding rate (QoS).

Similarly, when the available bit rate is much higher, transmitting one stream fragment takes less time than the time interval indicated by the timestamps, and the QoS value can be increased. The functionality of the QoS Adjuster module 320 is described in detail in FIG. 9 below.

When the display of the stream in the Mobile Unit 104 is temporarily paused, i.e. a cessation of transmission of the transcoded media fragments occurs, the Variable Bit Rate Transcoder 202 will not be able to send additional stream fragments. The Pause Detector module 322 is provided in order to detect this condition, and avoid incorrectly adjusting the QoS value. Timestamps are embedded in the original and transcoded medias as specified in the format standard documentation for the given original and transcoded media file formats. Timestamps are are embedded in at least some transcoded media fragments regardless of the format. Table 1 below shows a partial list of common media file formats and standard codecs which support timestamps. The timestamps define relative real time instances are used to lock the real time display of a received video sequence in the Mobile Unit 104 to a corresponding real time sequence of the original video sequence. As a result, the "display time", i.e. the time interval occupied by ordinarily (not fast-forwarded) displaying one or more transcoded media fragments at the mobile unit, can be estimated at the Variable Bit Rate Transcoder 202 by observing the timestamps in the transcoded media fragments when they are transmitted, and thus calculating an "estimated display time".

TABLE 1

File Format and Codec Standards

| File Format | Audio Codecs | Video Codecs |
| --- | --- | --- |
| F4V, MP4, 3GPP, 3GP2, MOV | AAC | H.263 |
| | AMR, AMR-WB | H.264 |
| | | MPEG-4 |
| FLV | AAC | H.263 |
| | MP3 | H.264 |
| | | VP6 |
| MPEG TS | AAC | MPEG-2 |
| | MP3 (MP2) | H.264 |
| WebM | Vorbis | VP8 |

Table 1 includes commonly understood acronyms used for naming various formats and corresponding codecs.

F4V and FLU are video file formats known as Flash Video from Adobe Systems. 3GPP (3rd Generation Partnership Project) and 3GPP2 (3rd Generation Partnership Project 2) provide 3G technologies for cellular phone networks based on UMTS (Universal Mobile Telecommunications System) and CDMA2000 (Code division multiple access) technologies respectively. MOV is a file format used in Quicktime (Apple Inc.). MPEG (Moving Picture Experts Group) TS (Transport Stream) defines the file format for MPEG streams. WebM is an audio-video format designed to provide an open video compression format for use with HTML5 video, sponsored by Google.

Acronym expansions for audio codecs listed here are: AAC (Advanced Audio Coding), AMR (Adaptive Multi-Rate audio codec), AMR-WB (Adaptive Multi-Rate audio codec-wideband) MP2 (MPEG-2 Audio standards) and MP3 where MP stands for MPEG-Part.

Vorbis is the name of an audio format and defines a codec implementation of Xiph.Org Foundation.

Among Video Codecs are codecs according to ITU (International Telecommunications Union) standards are defined in H.263 and H.264, while MPEG-2 and MPEG-4 are different versions of MPEG codec standards. VP6 is a video codec implementation from On2 Technologies, and VP8 is an open video compression format released by Google, originally created by On2 Technologies.

The Transcoder 314 may implement a transcoding of any of the listed formats (without prejudice) which are available and used in various systems at the present time. However, details of the Transcoder 314 are outside the scope of the present invention which is focused on supplying QoS (or encoding bit rate) parameters to the Transcoder 314 in order to adapt the transcoded bit rate to the available network bandwidth.

Dynamic Bit Rate Adaptation (DBRA) that is provided by the Dynamic Bit Rate Adapter 310 is intended for sessions that are transcoded on-the-fly. This means the audio and video streams of a media file are transcoded just-in-time by keeping the transcoding process synchronized to a wall clock. It is important that the transcoding is configured slightly faster than real-time for the DBRA algorithm to work. The transcoder 314 stores the transcoded data in the Transcoder Buffer 316 that is to be sent out. The transcoded frames are pushed from the Transcoder Buffer 316 through the HTTP connection as soon as they are transcoded.

When DBRA is enabled, transcoding sessions (a transcoding session will also be referred to simply as a session) are monitored from time to time, for example periodically (for example, at 3 second intervals) to assess the bandwidth that was available during the interval, by comparing the time it took to transmit an amount of transcoded data representing one or more video fragments (the transmit time, or estimated transmit time, defined earlier), as measured by the Wall Clock 318, with the time the video fragments will, or would, take to display in real time at the mobile unit 104 (the display time, or estimated display time, defined above), as indicated by timestamps that are embedded in the video fragments.

In other words, transmission time is governed by the available bit rate (bandwidth) of the network link, while display time is the time over which the receiving device, e.g. the Mobile Unit 104, displays the received fragment. Clearly, to prevent stalling, the fragment need to be transmitted in a time period that is not longer than the display time period of the actual video fragment.

Accordingly, embodiments of the present invention propose to estimate, in an open loop manner, the bandwidth that was available during the transmission of a fragment; compare it with the display time of the fragment; and if necessary adjust the transcoding bit rate for the next fragments to be sent accordingly. In the following, the terms "fragment" and "buffer" or "transcoded buffer" are used interchangeably.

Transcoded data (fragments) marked with timestamps according to their file formats, are forwarded through the Transcoder Buffer 316 to the network interface 308. When the transcoded data in the Transcoder Buffer 316 are sent out, their timestamps are checked to calculate an interval (Interval A, also referred to as a CurrentBufferInterval, see variable names in Table 2 below). The system sends transcoded data in the Transcoder Buffer 316 to the client and, once that is done, DBRA checks what the timestamp of that buffer was.

Two time intervals are determined:

Interval $A$=the timestamp of the buffer that was sent last, minus(−)the timestamp of the last buffer sent in the previous iteration; and Interval $B$=The current wall clock time minus(−)the wall clock time of the previous iteration.

Interval B is also referred to as a CurrentClockInterval, see variable names in Table 2 below.

The two intervals are compared from time to time and, if a significant difference is calculated (either positive or negative), the bit rate is adjusted (increased or decreased) by a factor that is relative to that difference. Note that the bit rate will never be increased above the initial bit rate that was established at the start of a session.

If Interval A is greater than Interval B, that means that the media can be delivered faster than real-time at the current bit rate, and thus it is possible to increase the bit rate.

If Interval B is greater than Interval A, that means that the media cannot be delivered in real-time with the bandwidth available, and that the encoding bit rate must be reduced.

The current clock interval (interval B) provides an estimated transmit time, or upper bound, i.e. the time taken to transmit transcoded media fragments from the buffer to the mobile unit (i.e. the time to leave the buffer and be consumed by the link, as described earlier) during that interval. The current buffer interval (interval A) is an estimate of the display time of the transcoded media fragments transmitted during the current clock interval. The video player in the mobile unit which is assumed to display the media, cannot be accessed directly or indirectly by the system of the embodiment of the invention. But the timestamps that are embedded in at least some of the transcoded media fragments and which the video player in the mobile unit uses to display the video in real time, provide this information.

In the present description, the term "fragment" is used with various qualifiers for clarification as necessary. The media file 328 (before transcoding) comprises fragments, also termed "media fragments", each media fragment corresponding for example to one or more video frames, or a certain minimum number of milliseconds of audio, sufficient for the operation of the transcoder. Each media fragment is of sufficient size so it can be transcoded. After transcoding, the corresponding "transcoded media fragment" has the same semantic content as the "media fragment", but generally comprising fewer bits. The "transcoded media fragments" are sent (streamed) to the mobile unit, where a group of a number of successive "transcoded media fragments" form a "stream fragment". According to an embodiment of the invention, a "stream fragment" comprises a number of "transcoded media fragments" representing about 3 seconds of real-time video or audio, that is an amount of transcoded media fragments which should take about 3 seconds to be displayed in real time at the mobile unit. This "display time" is specified by timestamps that are embedded in the original "media fragments" as well as the "transcoded media fragments". Since "transcoded media fragments" are sent through the transcoding buffer, these buffered fragment of the transcoded media may also be referred to simply as "transcoded buffers" or "transcoded buffer fragments".

Since the HTTP connection does not provide feedback from the video player, the DBRA algorithm also attempts to detect, or rather "guess" cases where the video player is paused. In such cases, the player buffer in the remote unit would eventually fill up and the player would stop reading data which would then cause the interval comparison to return a large difference between the encoding rate and the delivery rate. This would not be a network or bandwidth problem and is not a reason to decrease the bit rate.

The following attributes of user pauses are recognized because they are estimated to be indicators of a user pause:
 1. The wall clock interval is larger than the average wall clock interval which is adjusted at each iteration.
 2. The wall clock interval is larger by more than 1 second.
 3. The wall clock interval is larger than the average wall clock interval, multiplied by a factor of 4.
 4. A pause has not occurred more than 2 times yet.

When a pause case is detected, the bit rate is not modified and the wall clock interval for this irregular iteration is discarded, i.e. the wall clock interval average is readjusted in order to prevent further iterations from being affected.

A more detailed description of the functionality of the DBRA 310 is provided with the aid of flow charts in the following Figures.

Figure 4:
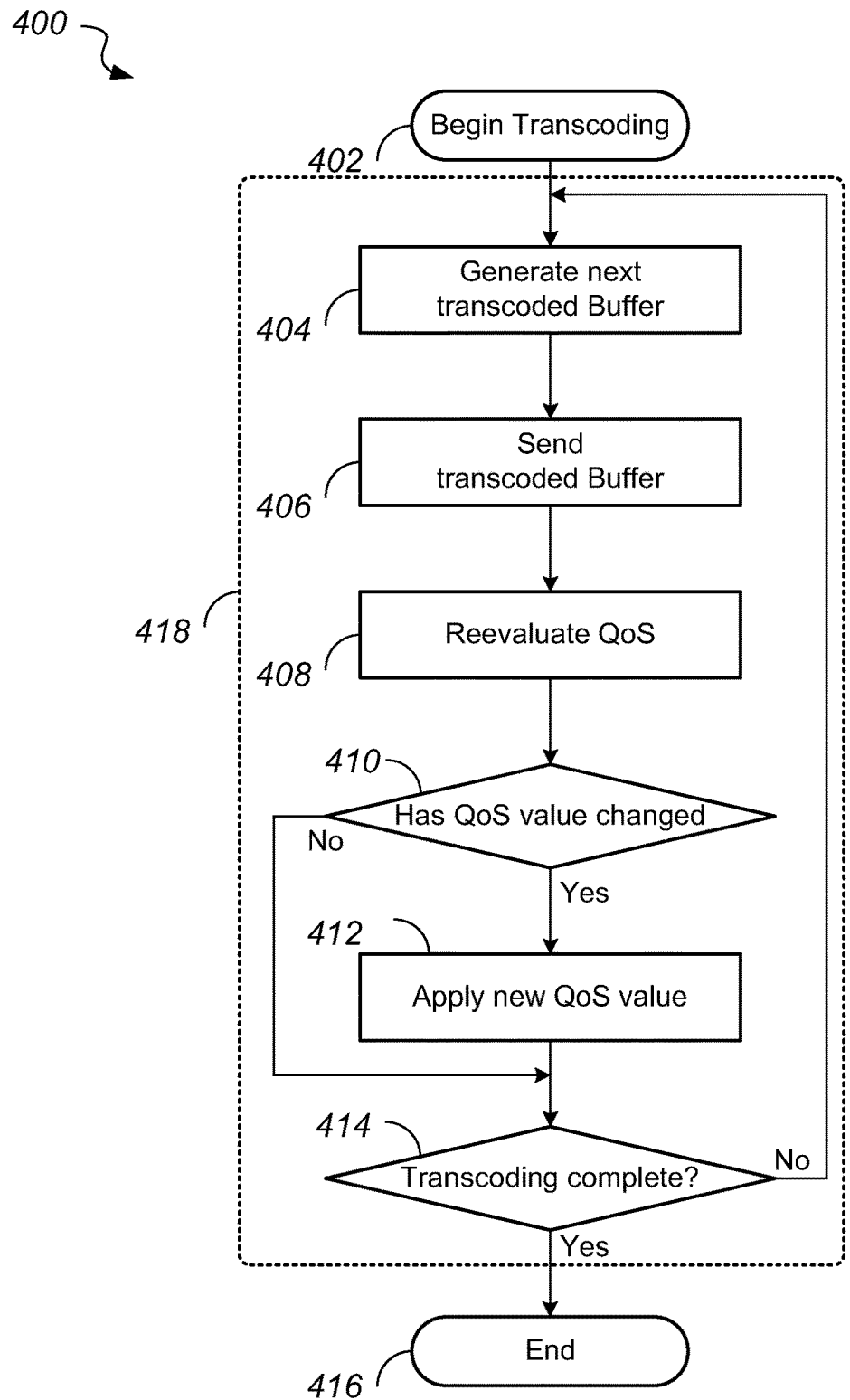
FIG. 4 shows a flowchart of a Dynamic Bit Rate Adaptation Process 400 according to an embodiment of the invention.

FIG. 4 shows a flowchart of a Dynamic Bit Rate Adaptation Process 400, comprising steps:
 402: "Begin Transcoding";
 404: "Generate next transcoded Buffer";
 406: "Send transcoded Buffer";
 408: "Reevaluate QoS";
 410: "Has QoS value changed?";
 412: "Apply new QoS value";
 414: "Transcoding complete?"; and
 416: "End".

The steps 404 "Generate next transcoded Buffer" to 414 "Transcoding complete?" form a Dynamic Bit Rate Adaptation Loop 418 that is executed until the media has been completely transcoded and sent. The loop may also stop if the session is aborted.

The step 402 "Begin Transcoding" is a starting point for the transcoding of the media. It represents the point in time where a new session is created for the media to be transcoded and sent to the client.

The step 404 "Generate next transcoded Buffer" represents the step of transcoding a fragment of the media file 328 into a transcoded media fragment, by generating a buffered fragment of the transcoded media, also referred to simply as a "transcoded buffer". It is created by applying an encoding algorithm in the transcoder 314 on the original media, i.e. the media file 328.

In the step 406 "Send transcoded Buffer" one transcoded buffer (a transcoded media fragment) is sent to the client over the established session, once it has been generated from the original media.

In the step 408 "Reevaluate QoS", the current QoS value is reevaluated or adjusted. This step is expanded in more detail in FIG. 5 below. The QoS value is potentially reevaluated (adjusted) every time a transcoded buffer has been sent. This allows the bit rate to be dynamically adjusted as the buffers are sent out.

In the step 410 "Has QoS value changed?", it is determined if the QoS value has been changed as a result of the reevaluation in the previous step. If the QoS value has been changed (exit "Yes" from step 410), the new QoS value is used to change the encoding bit rate for the generation of the next transcoded buffer as detailed in the step 412 "Apply new QoS value" expanded in more detail in FIG. 10 below, otherwise execution continues with the step 414: "Transcoding complete?" (exit "No" from step 410).

In the step 414: "Transcoding complete?", it is determined if the media has been completely transcoded and sent. If this is the case (exit "Yes" from step 414), the Dynamic Bit Rate Adaptation Process 400 ends with the step 416 "End", otherwise execution loops back to the step 404: "Generate next transcoded Buffer".

Session Variables used in the DBRA algorithm are Stored in the Session Variables Module 312 (FIG. 3) and tabulated in Table 2 below.

TABLE 2

Session Variables used in the DBRA algorithm

| Variable Name | Abbr. | Description |
| --- | --- | --- |
| CurrentTime | CT | The current wall clock time which increases in real time. |
| ClockIntervalAverage | CIA | The calculated average value of the wall clock difference between two QoS reevaluations. Since the algorithm waits at least 3 seconds before performing a new reevaluation, this is the minimal value for the variable. It is one of the elements used to attempt to detect when the media is paused. If a pause does occur, the value of CurrentClockInterval will most probably be much higher than ClockIntervalAverage. |
| ClockIntervalSum | CIS | The sum of all calculated wall clock differences between subsequent reevaluations of the QoS. In other words, it is the sum of all CurrentClockInterval values. It is used to update ClockIntervalAverage at each QoS reevaluation. |
| CurrentBufferInterval | CBI | The difference between the timestamp of the transcoded data buffer that has just been sent and the one that was sent previously. |
| CurrentBufferTimestamp | CBT | The timestamp of the transcoded data buffer that has just been sent. |
| CurrentClockInterval | CCI | The difference between the current wall clock time and the wall clock time when the previous transcoded data buffer was sent. |
| Delta | Delta | When reevaluating the QoS, the (positive) difference between CurrentBufferInterval and CurrentClockInterval. This is the first step in calculating the deviation from real-time. |
| Difference | Diff | When reevaluating the QoS, the ratio obtained by dividing Delta by the higher value between CurrentBufferInterval and CurrentClockInterval. This is the second step in calculating the deviation from real-time. |
| IntervalIndex | CII | The index of the current interval. It is incremented every time the QoS is reevaluated and CurrentClockInterval is higher than 3 seconds. IntervalIndex is used to calculateClockInterval Average. |
| PauseDetected | PD | Boolean value to indicate whether or not it was determined that the media was paused. |
| PauseGuessCount | PGC | The number of times that it was determined that the media was probably paused. |
| PreviousBufferTimestamp | PBT | The timestamp of the transcoded data buffer that had just been sent when the QoS reevaluation was last performed (at the previous IntervalIndex value). |
| PreviousClockIntervalSum | PCIS | The sum of all CurrentClockInterval values when the QoS reevaluation was last performed (at the previous IntervalIndex value). It is used to discard a given interval from the calculation of ClockIntervalAverage if a pause is detected. The data is removed from the average by recalculating |

TABLE 2-continued

Session Variables used in the DBRA algorithm

| Variable Name | Abbr. | Description |
|---|---|---|
| | | the value with PreviousClockIntervalSum and IntervalIndex. |
| PreviousQoSCalculationTime | PQCT | The wall clock time when the QoS was last calculated. It is used to calculate CurrentClockInterval. |
| QoS | QoS | The value that is calculated at each interval and, if necessary, sent to the encoder in order to modify the transcoding bit rate. A value less than 1 indicates to the encoder that the bit rate must be reduced. A value greater than 1 indicates that the bit rate may be increased. |
| TranscodingThrottlingRate | TTR | The rate at which media are sent to clients in Transcoding mode as a factor of the clock rate rather than the media bit rate. For example, 1.0 is equal to the clock rate and 2.0 is double the clock rate. |

Figure 5:
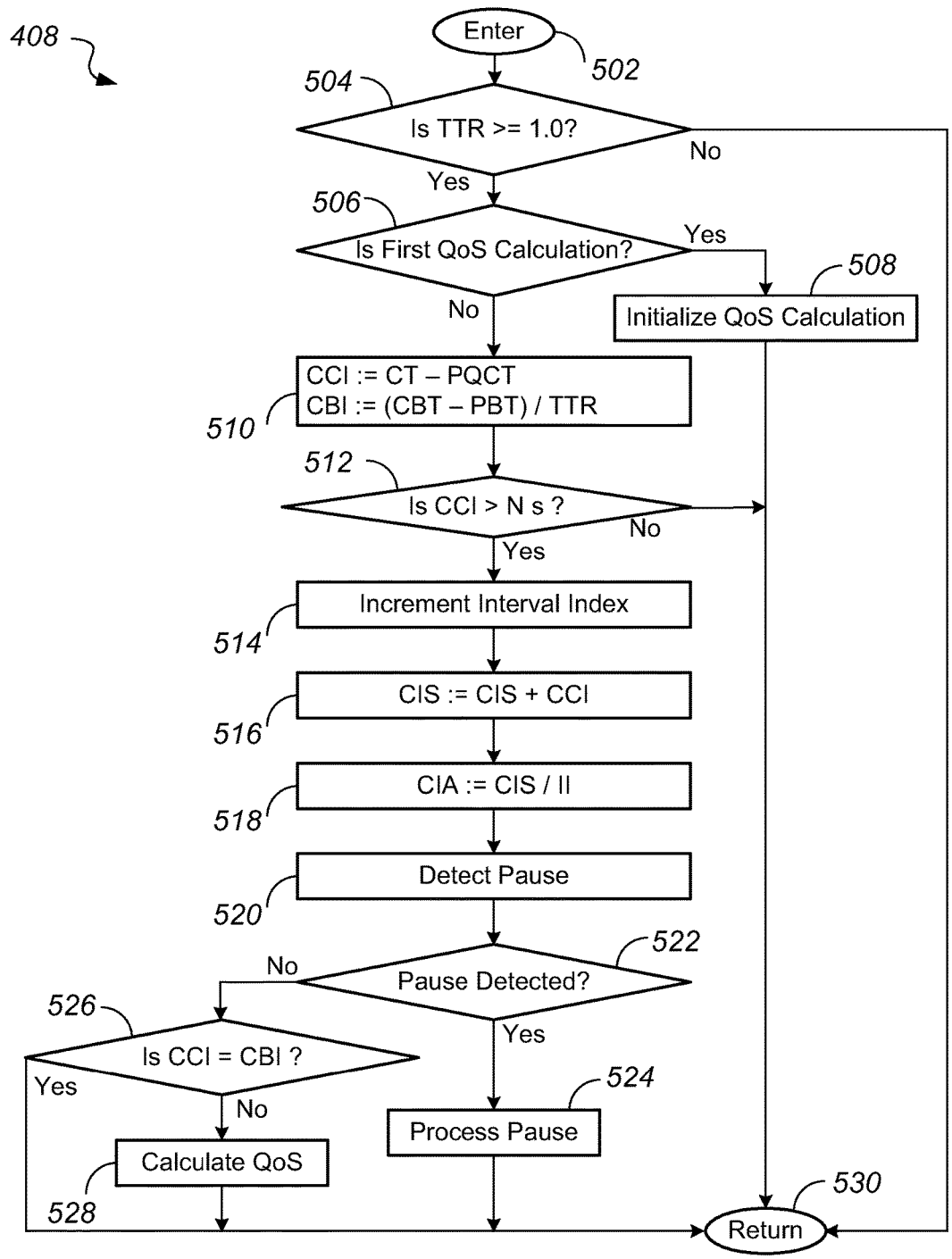
FIG. 5 is a more detailed flowchart of the QoS reevaluation step 408 of FIG. 4.

FIG. 5 is a more detailed flowchart of the QoS reevaluation step 408 of FIG. 4, including steps:
502: "Enter";
504: "Is TTR>=1.0?"
506: "Is First QoS Calculation?";
508: "Initialize QoS Calculation";
510: "Calculate Current Clock Interval (CCI) and Current Buffer Interval (CBI)":
512: "Is CCI>N s?";
514: "Increment Interval Index";
516: "Calculate Clock Interval Sum";
518: "Calculate Clock Interval Average";
520: "Detect Pause";
522: "Is Pause Detected?";
524: "Process Pause";
526: "Is CCI equal CBI?";
528: "Calculate QoS"; and
530: "Return".

The QoS reevaluation step 408 is entered with the step 502 "Enter", computes a new QoS values in the steps 504 to 528, and returns with the step 530 "Return".

In the step 504 "Is TTR>=1.0?", it is determined whether the current Transcoding Throttling Rate is equal or greater than 1.0. If it is (exit Yes from step 504), execution continues with the next step 506, otherwise (exit No from step 504) transcoding to reduce the bit rate is not required and the procedure returns (the step 530).

TTR is a parameter that is established when a session is configured. When TTR is less than 1.0, transcoding is not performed, and the procedure returns immediately. TTR provides a way to control the speed at which the original media will be transcoded. With a TTR of 1.0, a 1 minute media would be transcoded in about 1 minute. With a TTR of 2.0, that media would be transcoded in about 30 seconds. This value provides a way to tweak the transcoding speed vs CPU usage ratio. Increasing TTR provides the transcoded media faster but uses more CPU. Bit rate applies to both the original and transcoded media. Both have encoding bit rates but the job of the DBRA 310 is to dynamically modify the bit rate of the transcoded media as required, for example by telling the transcoder 314 to transcode at a lower bit rate resulting in a transcoded media that has a lower bit rate than the original.

In the step 506 "Is First QoS Calculation?", it is determined whether this is the first QoS calculation for this session. If it is (exit Yes from step 506), execution continues with the step 508 "Initialize QoS Calculation" in which various Session Variables are initialized. The step 508 is expanded in FIG. 6 below. If this is not the first QoS calculation for this session (exit No from step 506), execution continues with the step 510.

In the step 510 "Calculate Current Clock Interval (CCI) and Current Buffer Interval (CBI)", the Current Clock Interval and the Current Buffer Interval are calculated as follows:

$$CCI:=CT-PQCT,$$

where CT is the Current Time and
PQCT is the Previous QoS Calculation Time;
and $$CBI:=(CBT-PBT)/TTR,$$

where PBT is the Previous Buffer Timestamp and
TTR is the Transcoding Throttling Rate.

CCI and CBI are used in the calculation of the new QoS value. The Current Clock Interval is the period of time spanning from the Previous QoS Calculation time as computed in the step 528 to the Current Time. The Current Buffer Interval is obtained by dividing the period of time spanning from the Previous Buffer Timestamp as computed in the step 528 to the Current Buffer Timestamp, divided by the Transcoding Throttling Rate. The Transcoding Throttling Rate (TTR) is specified in the configuration file when the media session is established (step 402, FIG. 4).

In the step 512 "Is CCI>N s?", it is determined if the current clock interval (CCI) exceeds a minimum current clock interval of N seconds, where N is preferably set to a value of 3, but may range between 2 and 5 seconds for example. If it does (exit Yes from step 512), execution continues with the next step 514, otherwise (exit No from step 512) the procedure returns (the step 530). The value of N is chosen to provide a sufficiently quick response to changes in available bandwidth, in order to protect video buffers from over- or underflowing. The step 512 ensures that an actual reevaluation of the current encoding rate (step 528, "Calculate QoS") is carried out in effect periodically, approximately every N seconds.

In the step 514 "Increment Interval Index", the current interval index (CII) is incremented. The interval index must be increased every time the QoS is recalculated. It is used as a divisor when calculating interval averages.

In the step 516 "Calculate Clock Interval Sum", the current clock interval sum (CIS) is updated by incrementing with the new clock interval (the current clock interval CCI).

The sum of clock intervals is kept so that the clock interval average may be calculated in the next step.

In the step 518 "Calculate Clock Interval Average", the clock interval average (CIA) is computed as the result of dividing the current sum of clock intervals (CIS) by the current interval index (CII) that has been set in the step 514 above.

In the step 520 "Detect Pause", conditions are analyzed which are heuristically sufficient to indicate, as a guess, that the user has probably paused the media. It is an informed guess but not a certainty. The step 520 is expanded in FIG. 7 below.

In the step 522 "Pause Detected?", the result of the previous step 520 is used to determine if the user has probably paused the media. If a pause was detected (exit Yes from step 522) the pause is processed in the next step 524, otherwise (exit No from step 522) execution continues with the step 526.

In the step 524 "Process Pause", algorithm variables are adjusted in order that the available bandwidth not be incorrectly underestimated. The step 524 which is expanded in more detail in FIG. 8 below, is necessary in order to try to distinguish bandwidth problems from a pause of the media initiated by the user. Both will lead to slow or stopped buffer transmittal.

In the step 526 "Is CCI equal CBI?", it is determined if the transmission time of the last transcoder buffer corresponds with the real time as indicated by the wall clock. This is demonstrated by equality of the current buffer interval (CBI) and the current clock interval (CCI). If they are equal (exit Yes from step 526), there is no need to recalculate the QoS and the step 408 is terminated by returning with the step 530, otherwise (exit No from step 526) a new QoS value is calculated in the next step 528.

In the step 528 "Calculate QoS", a new QoS value is computed in preparation of the next iteration of the Dynamic Bit Rate Adaptation Loop 418, but only when there is a difference between the clock and buffer intervals as determined in the previous step 526, and if no pause has been detected as determined in the step 522 above. After the step 528, the process of step 408 is terminated by returning with the step 530. The step 528 is expanded in more detail in FIG. 9 below.

Figure 6:
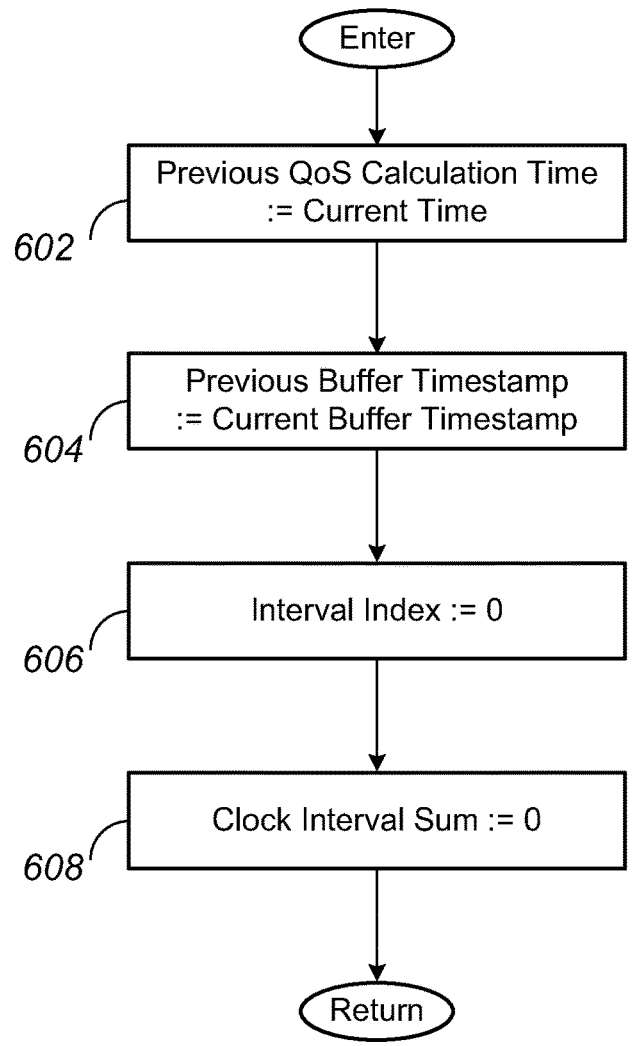
FIG. 6 shows an expanded flow chart of the step 508 "Initialize QoS Calculation" of FIG. 5.

FIG. 6 shows an expanded flow chart of the step 508 "Initialize QoS Calculation" of FIG. 5, including steps:
602: "Previous QoS Calculation Time:=Current Time";
604: "Previous Buffer Timestamp:=Current Buffer Timestamp";
606: "Interval Index:=0"; and
608: "Clock Interval Sum:=0".

When a transcoded buffer is sent out, the values of PreviousQoSCalculationTime, PreviousBufferTimestamp, IntervalIndex, and ClockIntervalSum are saved, but when a new session is started, and before first transcoded buffer is sent out, these saved values must be initialized (in the steps 602 to 608).

In the step 602 "Previous QoS Calculation Time:=Current Time", the PreviousQoSCalculationTime is initialized to the Current Time. There is no real Previous QoS Calculation Time since this is only the first QoS calculation. The value is saved for use in the next QoS calculation.

In the step 604 "Previous Buffer Timestamp:=Current Buffer Timestamp", the value of the Previous Buffer Timestamp is initialized to the Current Buffer Timestamp. There is no real Previous Buffer Timestamp as it is the first buffer. The value is saved to be used in the next QoS calculation.

In the step 606 "Interval Index:=0", the Interval Index is initialized to 0. This is not the first interval yet as the first interval is calculated from the first two buffers.

In the step 608 "Clock Interval Sum:=0, the clock interval sum is initialized to 0. There is no clock interval sum yet as the first interval does not exist yet as explained in the step 606.

Figure 7:
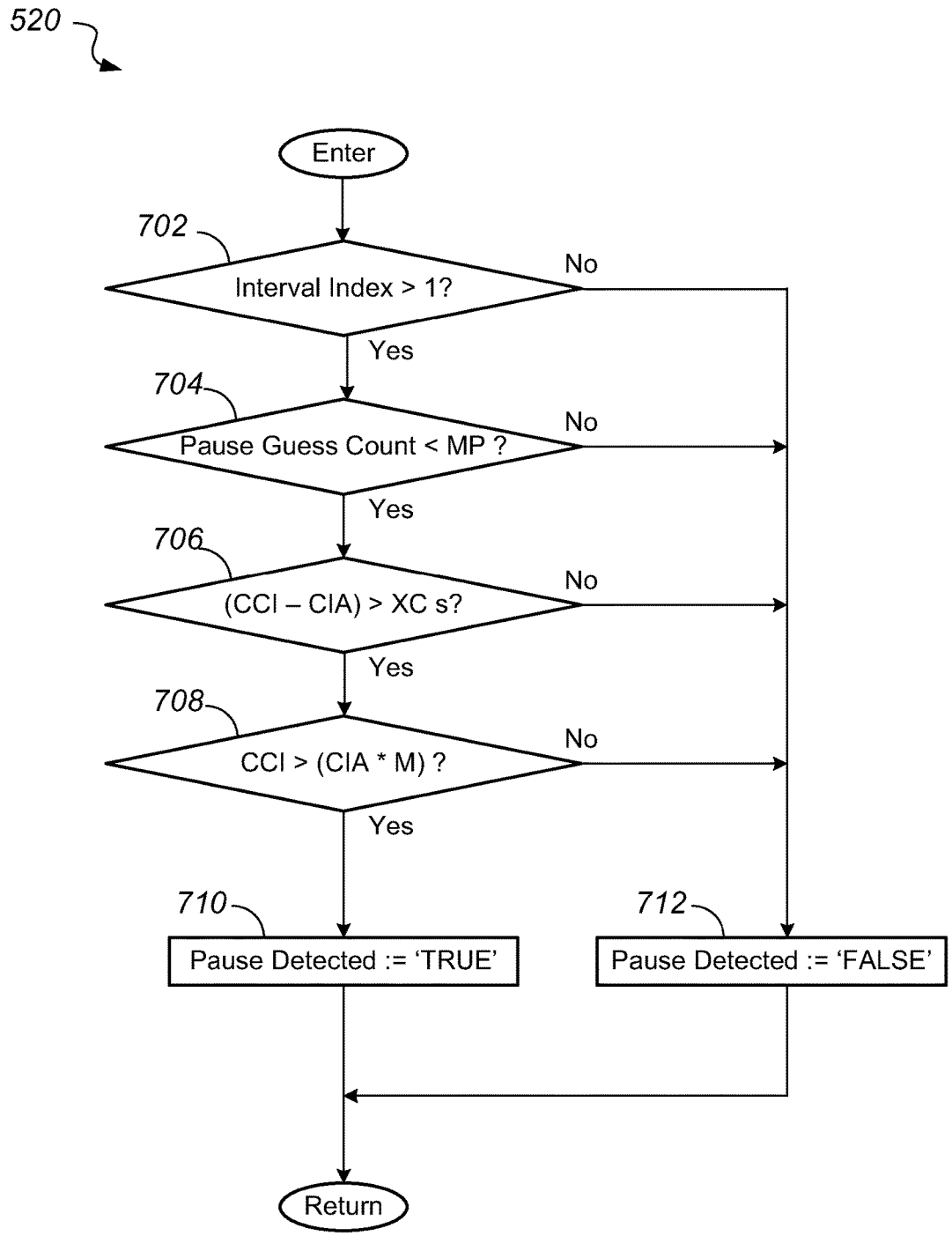
FIG. 7 illustrates an expanded flow chart of the step 520 "Detect Pause" of FIG. 5.

FIG. 7 illustrates an expanded flow chart of the step 520 "Detect Pause" of FIG. 5, including steps:
702: "Interval Index>1?";
704: "Pause Guess Count<MP?";
706: "(CCI−CIA)>XC s?";
708: "CCI>(CIA*M)?";
710: "Pause Detected:='TRUE'; and
712: "Pause Detected:='FALSE'.

The steps 702 to 708 comprise a number of conditions, which are tested to determine if a pause is detected. Only if all of these conditions are true, a pause is deemed to have occurred.

In the step 702 "Interval Index>1?" it is determined if the Interval Index is greater than one. If not (exit "No" from the step 702) execution jumps to the step 712, otherwise the next condition is tested in the step 704.

In the step 704 "Pause Guess Count<MP?" it is determined if the Pause Guess Count, i.e. the number of detected pauses, is lower than a maximum number of detected pauses "MP", the value of MP preferably being set to 3. If not (exit "No" from the step 704) execution jumps to the step 712, otherwise the next condition is tested in the step 706.

In the step 706 "(CCI−CIA)>XC s?" it is determined if the Current Clock Interval (CCI) is more than a margin "XC" of seconds greater than the calculated Clock Interval Average (CIA), the value of the margin XC preferably being set to 1. If not (exit "No" from the step 706) execution jumps to the step 712, otherwise the next condition is tested in the step 708.

In the step 708 "CCI>(CIA*M)?" it is determined if the value of the Current Clock Interval (CCI) is more than a factor "M" times the calculated Clock Interval Average (CIA). If not (exit "No" from the step 708) execution jumps to the step 712, otherwise execution continues with the step 710. The factor "M" is preferably set to a value of 4.

In the step 710 "Pause Detected:='TRUE', the Boolean variable PauseDetected (PD) is set to 'TRUE' and the process of the step 520 is finished.

In the step 712 "Pause Detected:='FALSE', the Boolean variable PauseDetected (PD) is set to 'FALSE' and the process of the step 520 is finished.

It is noted that the preferred values of the constants "MP", "XC", and "M" have been selected to provide a reasonable "guess" in detecting when a pause has occurred, and not simply a reduction in the available bandwidth. Different values may also be found to be effective.

Figure 8:
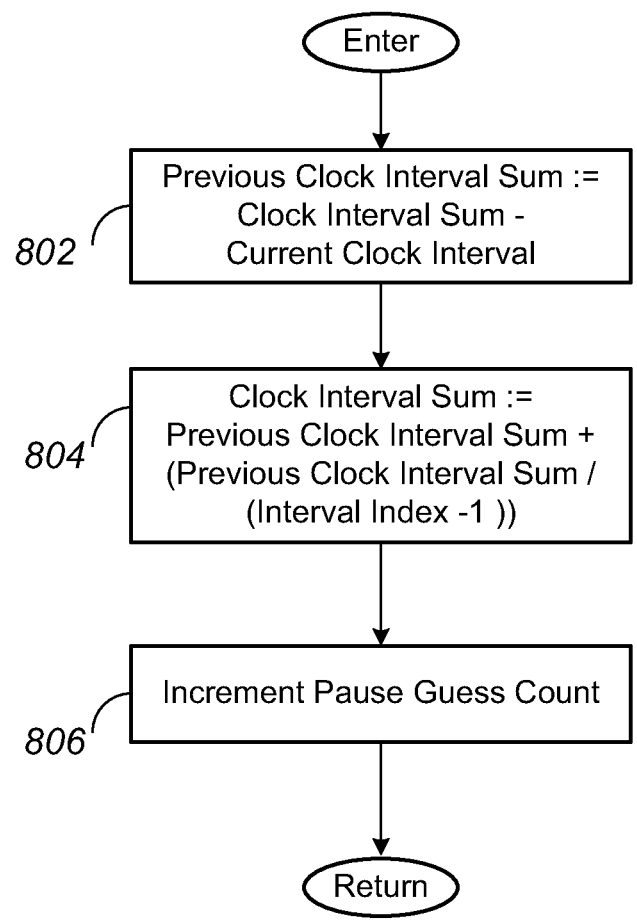
FIG. 8 illustrates an expanded flow chart of the step 524 "Process Pause" of FIG. 5.

FIG. 8 illustrates an expanded flow chart of the step 524 "Process Pause" of FIG. 5, including steps:
802: "Previous Clock Interval Sum:=Clock Interval Sum−Current Clock Interval";
804: "Clock Interval Sum:=Previous Clock Interval Sum+(Previous Clock Interval Sum/(Interval Index−1)); and
806: "Increment Pause Guess Count".

In the process of the step 524, a detected user pause is processed by updating relevant variables.

The step 802 "Previous Clock Interval Sum:=Clock Interval Sum−Current Clock Interval" may be expressed more concisely as PCIS:=CIS−CCI. The value of the Previous Clock Interval Sum is reset to its former value, as the current Clock Interval Sum minus the value of the Current Clock Interval.

The step 804: "Clock Interval Sum:=Previous Clock Interval Sum+(Previous Clock Interval Sum/(Interval Index−1)) may be expressed more concisely as CIS:=PCIS+ (PCIS/(II−1)). The value of the current Clock Interval Sum is set to a value estimated from the corrected Previous Clock Interval Sum incremented by an average increment computed as the Previous Clock Interval Sum divided by the number of Intervals less one (the present pause interval).

In the step 806: "Increment Pause Guess Count", which may also be expressed more concisely as PGC:=PGC+1, the Pause Guess Count is incremented by one to prevent pauses to be detected above a certain limit (see step 704 above).

The process of the step 524 is mainly a corrective recalculation of the clock interval sum (and therefore clock interval average) after an abnormally long clock interval has led to the detection of a user pause. Such clock intervals are discarded and replaced with the average clock interval so that they do not have an impact on the subsequent calculations. They are basically ignored because user pauses are not bandwidth problems and should not lead to a modification of the bit rate.

Figure 9:
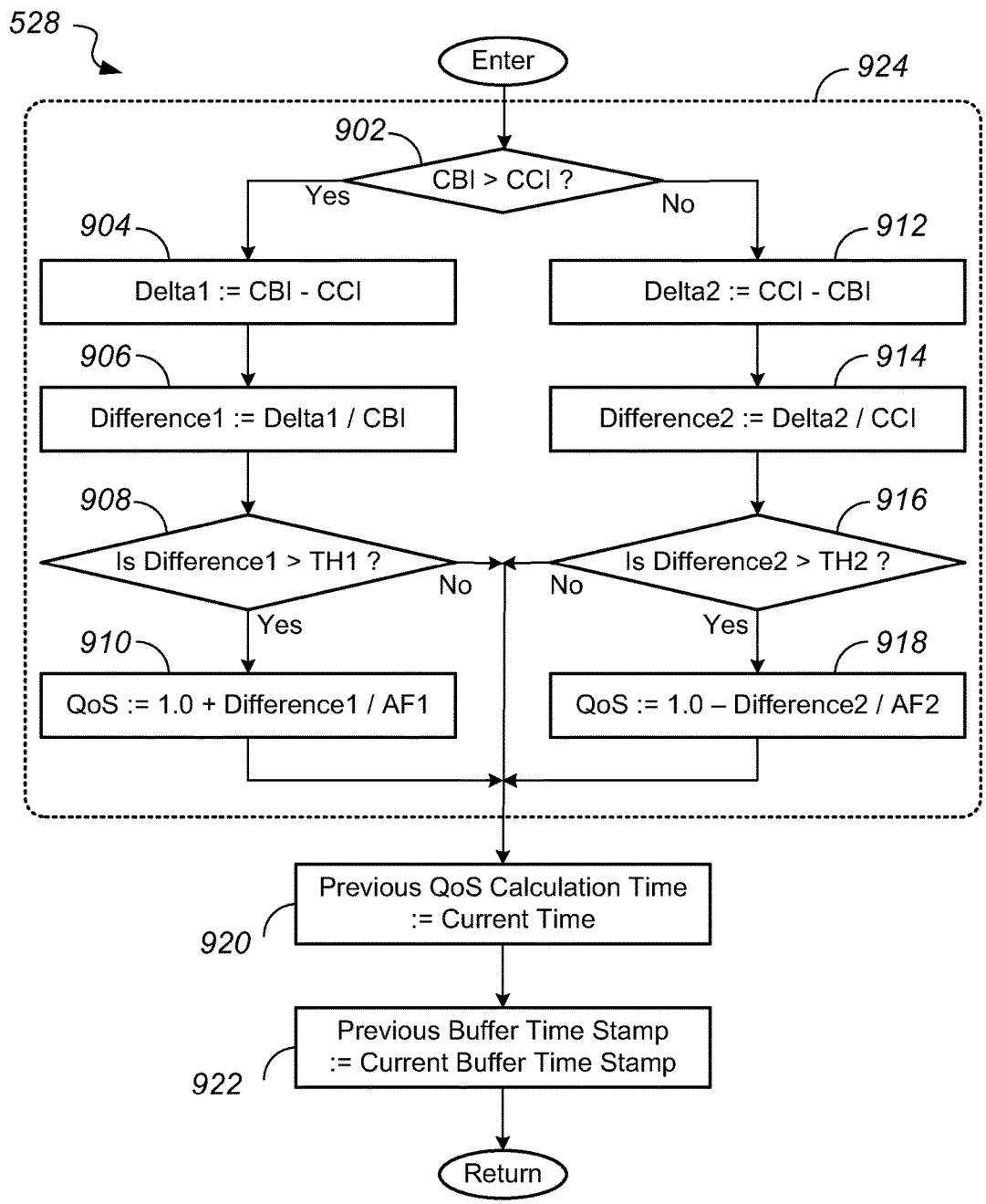
FIG. 9 is an expanded flow chart of the step 528 "Calculate QoS" of FIG. 5.

FIG. 9 is an expanded flow chart of the step 528 "Calculate QoS" of FIG. 5, including steps:

902: "CBI>CCI?";
904: "Delta1:=CBI−CCI";
906: "Difference1:=Delta1/CBI";
908: "Is Difference1>TH1?";
910: "QoS:=1.0+Difference1/AF1";
912: "Delta2:=CCI−CBI";
914: "Difference2:=Delta2/CCI";
916: "Is Difference2>TH2?";
918: "QoS:=1.0+Difference2/AF2";
920: "Previous QoS Calculation Time:=Current Time"; and
922: "Previous Buffer Time Stamp:=Current Buffer Time Stamp".

In the process of the step 528, the QoS value is recalculated by evaluating any change in the apparent link bandwidth which is estimated from the difference between the CurrentClockInterval (CCI) and the CurrentBufferInterval (CBI), and incrementing or decrementing QoS accordingly to follow the change.

The steps 902 to 918 are provided in a bit rate adaptation function 924 which is illustrative of the functionality of the QoS Adjuster module 320 of FIG. 3. The step 528 is only entered when In the step 902 "CBI>CCI?", it is determined whether the value of CBI (the Current Buffer Interval) is larger than the value of CCI (Current Clock Interval). If CBI is larger than CCI, the value of QoS will be increased as computed in the steps 904 to 910, otherwise the value of QoS will be decreased as computed in the steps 912 to 918. The step 902 is only entered when CBI is not equal to CCI, as determined in the earlier step 526 (FIG. 5).

The step 904 "Delta1:=CBI−CCI" illustrates the calculation of a delta (Delta1) between the Current Clock Interval and the Current Buffer Interval when the Current Buffer Interval is greater than the Current Clock Interval, i.e. when the bit rate should be increased.

The step 906 "Difference1:=Delta1/CBI" illustrates the calculation of a first relative difference (Difference)) to indicate how much proportionately greater than the Current Clock Interval the Current Buffer Interval is. The value of Difference1 is obtained by dividing the delta (Delta1) calculated in step 904 by the Current Buffer Interval. A new QoS value will then be calculated in step 910, but only if Difference1 is greater than a first threshold "TH1" as determined in the step 908 "Is Difference1>TH1?". The threshold helps prevent bit rate modifications for very low fluctuations.

In the step 908 "Is Difference1>TH1?", it is determined if the first relative difference calculated in the previous step exceeds the first threshold. The first threshold TH1 is preferably set to a value of at least 0.05, corresponding to a relative difference of 5%. If the first relative difference does exceed the first threshold (exit "Yes" from the step 908) execution continues with the next step 910 in which the value of QoS will be adjusted, otherwise QoS will not be adjusted and execution jumps to the step 920.

The step 910 "QoS:=1.0+Difference1/AF1", illustrates how the new QoS value is calculated when it is determined that the bit rate should be increased by a first incremental value. Since a value of 1.0 indicates no modification, lesser QoS values would indicate a bit rate decrease and higher QoS values indicate a bit rate increase. The adjusted QoS value will thus be greater than 1.0 in this case. In the step 910, the first incremental value is computed as the first relative difference (Difference1) from step 906 above, divided by a first attenuation factor "AF1" which preferably has a value of about 8.0. The first incremental value, added to 1.0 is the new QoS value that will be sent to the encoder (in step 412, FIG. 4) so that it increases the QoS factor (corresponding to the encoding bit rate) by the first incremental value.

The step 912 "Delta2:=CCI−CBI" illustrates the calculation of the delta (Delta2) between the Current Clock Interval and the Current Buffer Interval when the Current Buffer Interval is not greater than the Current Clock Interval, i.e. when the bit rate should be decreased or remain unchanged.

The step 914 "Difference2:=Delta2/CCI" illustrates the calculation of a second relative difference as a ratio that indicates how much greater than the Current Buffer Interval the Current Clock Interval is. The value of Difference2 is obtained by dividing the delta (Delta2) calculated in step 912 by the Current Clock Interval. A new QoS value will then be calculated in step 918, but only if Difference2 is greater than a second threshold "TH2", as determined in the step 916 "Is Difference2>TH2?". This helps prevent bit rate modifications for very low fluctuations.

In the step 916 "Is Difference2>TH2?", it is determined if the second relative difference calculated in the previous step exceeds the second threshold. The second threshold TH2 is preferably set to a value of at least 0.02, corresponding to a relative difference of 2%. If the second relative difference does exceed the second threshold (exit "Yes" from the step 916) execution continues with the next step 918 in which the value of QoS will be adjusted, otherwise QoS will not be adjusted and execution jumps to the step 920.

The thresholds TH1 and TH2 help prevent unnecessary bit rate modifications for very low fluctuations.

The step 918 "QoS:=1.0+Difference2/AF2", illustrates how the new QoS value is calculated when it is determined that the bit rate should be decreased by a second incremental value. In the step 918, the second incremental value is computed as the second relative difference (Difference2) from step 914 above, divided by a second attenuation factor "AF2" which preferably has a value of about 6.0. The second incremental value, added to 1.0 is the new QoS value that will be sent to the encoder (in step 412, FIG. 4) so that it decreases the QoS factor (corresponding to the encoding bit rate) by the second incremental value.

The values of the attenuation factors AF1 and AF2 have been chosen to ensure stability of the adjustment algorithm, that is to prevent excessive or too rapid over-corrections of the encoding rate (QoS value). Without any adjustment factors, each adjustment of the encoding rate would cause the encoding rate to continuously bounce from too-high to too-low with each adjustment. The adjustment factors reduce the impact of each correction and have a sort of damping effect, so that ideally, the encoding rate gradually approaches the transmission bit rate over a number of adjustment intervals. On the other hand, If the adjustment factors are too large (excessive damping), the approach of the encoding rate to the transmission bit rate would be too slow. By judiciously choosing the adjustment factors AF1 and AF2, a sufficiently rapid correction is achieved.

In the step 920 "Previous QoS Calculation Time:=Current Time", the Current Time is saved as the Previous QoS Calculation Time (PQCT) after each QoS calculation so that the value of PQCT may be used in the calculation step 510 (FIG. 5) of the next iteration of the Dynamic Bit Rate Adaptation Loop 418 (FIG. 4).

Similarly, in the step 922 "Previous Buffer Time Stamp:=Current Buffer Time Stamp", the Current Buffer Time Stamp is saved as the Previous Buffer Time Stamp (PBTS) after each QoS calculation so that the value of PBTS may be used in the calculation step 510 (FIG. 5) of the next iteration of the Dynamic Bit Rate Adaptation Loop 418 (FIG. 4).

The preferred values of the parameters "TH1", "TH2", "AF1", and "AF2" have been selected to provide the desired adjusting behavior as described. Other values may work equally well or better. For example it is suggested that "TH1" and "TH2" be set to at least 0.05, and 0.02 respectively, while the proposed values for "AF1", and "AF2" (8.0 and 6.0 respectively) are only approximate.

Figure 10:
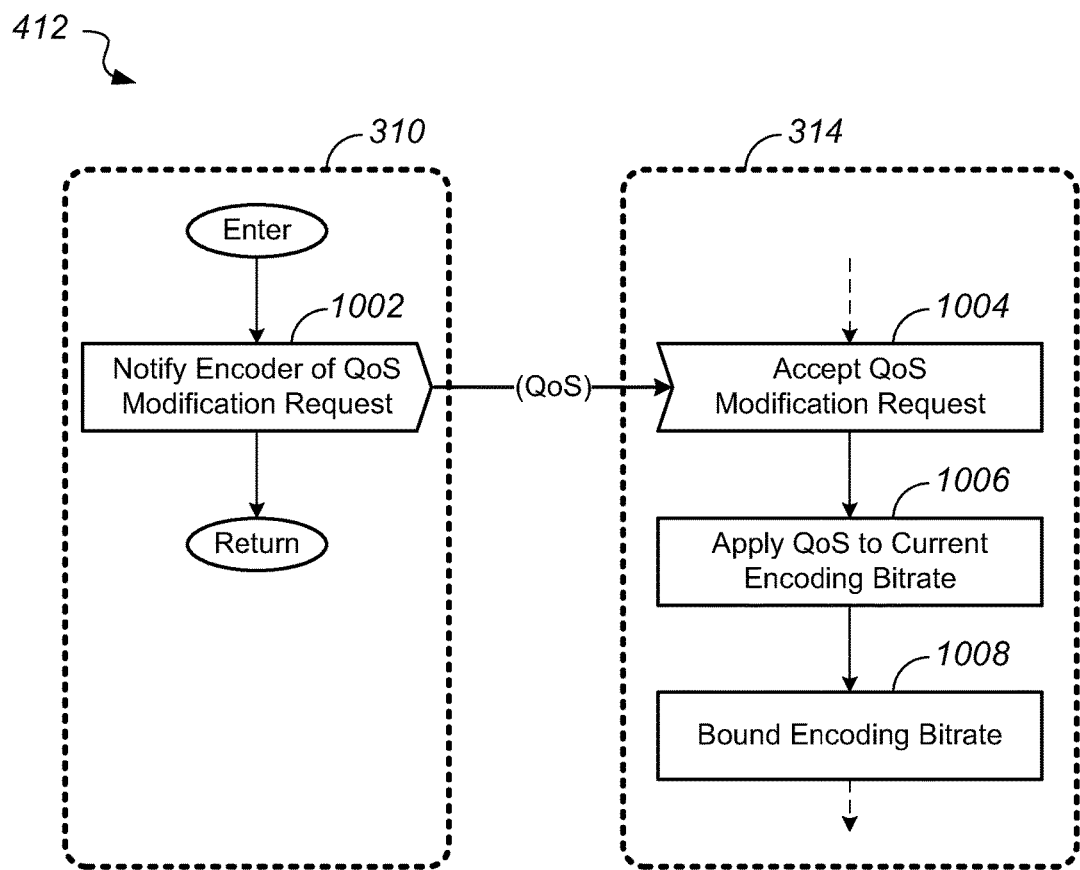
FIG. 10 is an expanded flow chart of the step 412 "Apply new QoS value" of FIG. 4.

FIG. 10 is an expanded flow chart of the step 412 "Apply new QoS value" of FIG. 4, including steps:
1002: "Notify Encoder of QoS Modification Request";
1004: "Accept QoS Modification Request";
1006: "Apply QoS to Current Encoding Bit Rate"; and
1008: "Bound Encoding Bit Rate".

The step 1002 is performed in the Dynamic Bit Rate Adapter 310 (FIG. 3), whence the updated QoS value is communicated to the Transcoder 314 (FIG. 3) in which the remaining steps 1004 to 1008 are performed. It is noted that the Transcoder 314 has a capability for receiving QoS modification notifications from the DBRA adapter 310 within the Variable Bit Rate Transcoder subsystem 202.

In the step 1002 "Notify Encoder of QoS Modification Request", an event comprising a QoS notification is sent from the Dynamic Bit Rate Adapter 310 to the Transcoder 314.

In the step 1004 "Accept QoS Modification Request", the QoS notification is received and accepted by the Transcoder 314.

In the step 1006 "Apply QoS to Current Encoding Bit Rate", the Transcoder 314 will modify the active encoding bit rate when this change notification is received. The difference in bit rate is dependent on, and proportional to, the new QoS value.

In the step 1008 "Bound Encoding Bit Rate", while modifying the encoding bit rate to correspond to the new QoS value, it ensured that the actual encoding bit rate is bound within configured minimum and maximum values even if applying the new QoS value would mathematically lead to a bit rate that is out of that range.

The DBRA algorithm (also referred to as an original service) of an embodiment of the invention may be summarized in the following steps:
(a1) a HTTP session (a transcoding session, or simply "session") is established between the server or a proxy and the mobile unit;
(b1) an initial bit rate (encoding rate) is established with the mobile unit;
(c1) the mobile unit requests the media file using HTTP-GET;
(d1) the transcoded media is transmitted from the server in its entirety, the bit rate being manipulated as described above; no additional GET requests are received from the mobile unit;
(e1) when the transcoded media has been sent, the HTTP session is closed.

The initial bit rate is determined from the bit rate of the original media that is being transcoded and the profile of the mobile unit in the session configuration. The original service does gradually transcode and send the media to the client without receiving any additional HTTP requests. The session is closed once the media has been sent (or the client aborts). The bit rate may be modified after every buffer is sent.

In another embodiment of the invention, a modified DBRA algorithm (also referred to as a modified service) is proposed, summarized in the following steps:
(a2) a transcoding (HTTP) session is established between the server or a proxy and the mobile unit;
(b2) an initial bit rate is established with the mobile unit;
(c2) the mobile unit requests only a segment of the media file using HTTP-GET;
(d2) the transcoded media segment is transmitted from the server, the bit rate not being manipulated during the transmission of the segment;
(e2) when the segment has been sent, the session is suspended until the mobile unit decides to request (GET) another segment, at which time:
(f) a new bit rate is computed for the next segment from saved parameters of the previous segment transmission, and
(g) the transcoding session is continued, i.e. go to step (c2).

It is noted that each segment requested by the mobile unit is composed of one or more media fragments. The transcoded media segment of the modified service effectively corresponds to the stream fragment of the original service in terms of encoding rate adjustments, the difference being that stream fragments of the original service are delineated by time (approximately N-second intervals) whereas in the modified service, transcoded media segments (stream fragments) are defined by way of the segments as they are requested by the mobile unit.

The modified DBRA algorithm has been designed to match usage conventions by certain SmartPhones, for example the iPhone manufactured by Apple Inc., where individual but related short segment sessions (TCP sessions) within a transcoding session (HTTP session) are established for downloading media content.

In the modified DBRA algorithm, the initial bit rate is determined from the bit rate of the original media that is being transcoded and the profile of the mobile unit (configuration). The client, i.e. the mobile unit, requests the media using HTTP. It first receives a playlist that tells it which segments exist and where they are located; no transcoding is involved yet. The client then requests a segment using HTTP. Upon the first such request, a transcoding session is created on the server by the modified service. Successive bit rate adjustments to apply to each segment are determined based on the information kept in a transcoding segment state, i.e. time intervals, etc. The modified service transcodes and sends the transcoded segment in transcoded media fragments; transcoded media fragments (transcoded buffers) are sent to the client until the end of the segment is reached. The client then requests the next segment unless it was the last segment of the playlist or the client aborts, at which time the transcoding session is terminated on the server. The modified service recognizes that each transcoding segment is part of the same transcoding session and transcodes each next requested segment with a re-adjusted bit rate and sends it.

Before a segment is transcoded, the transcoding segment state is used to determine a percentage to apply to the initial (original) bit rate. The transcoded bit rate cannot be higher than the initial bit rate so that percentage cannot be higher than 100%.

The original service provides transmission of the media file in a single session during which the transcoder bit rate may be adjusted after each transcoded stream fragment (which may contain as little as a single transcoded media fragment) is sent, while in the modified service individual segments (also referred to as media segments) are transmitted in separate related segment sessions and the transcoder bit rate is adjusted before each segment session, except before the first session in which the originally established bit rate is used. Even though a segment is also sent as a series of transcoded buffers (transcoded media fragments), no bit rate modification is proposed to be made from buffer to buffer in the same segment.

The QoS value (bit rate) for the initial segment is established by the mobile unit, and is a function of the properties of the mobile unit. Before transcoding of each subsequent segment starts a QoS value is calculated as described in detail in FIG. 12 below (duration of last segment divided by segment start interval, and multiplied by the QoS that was last saved when the previous segment was requested). The transcoder bit rate (i.e. the QoS) is readjusted every time a segment is requested, by multiplying the "cumulative" saved QoS value by a value calculated based on the last segment. That value provides a factor to apply to the initial bit rate of the segment before the start of transcoding the next segment. Since a segment request is a new connection for a segment file that has an (original) initial bit rate indicated in the request, it is necessary to remember at what percentage of that initial bit rate the next segment should be transcoded. That percentage is then adjusted every time another segment is requested.

The "start intervals" of the modified service correspond to the "current clock intervals" of the original service; both are used in computing the estimated transmit time for comparison with the estimated display time–the display time of a segment of fragments (modified service) vs. the display time of a stream fragment, i.e. the transcoded media fragments transmitted in each approximate 3-second interval (original service).

In the modified service, it is assumed that the media segments are sufficiently short, so that the bit rate does not need to be varied during the segment, i.e. multiple transcoded buffers (transcoded media fragments) are sent at the bit rate established after the previous media segment was sent. The bit rate may be varied only between segments.

Pause detection in the original service uses the clock interval average to determine if the last clock interval was "abnormally" long. Pause detection in the modifiedservice uses a corresponding average of the start intervals (the time between two segment requests) to determine if the last start interval was much too long. Therefore, no pause detection is attempted during the transmission of a segment. If a pause is detected, this will be a case when a segment is requested and it is realized that it has been a long time since the last segment was requested. If other conditions are met (the number of times a pause was detected, and how out-of-the-ordinary the interval is, etc), it is assumed, or guessed, that the video was paused and no bit rate modification is done.

It may be possible to combine, or at least partially combine, both embodiments, i.e. run the original service for the transcoded buffers of each segment including pause detection during a segment, then reset the QoS for the next segment according to the accumulated average segment bit rate. It would be possible to integrate some of the original service for the processing of buffers inside a segment.

Figure 11:
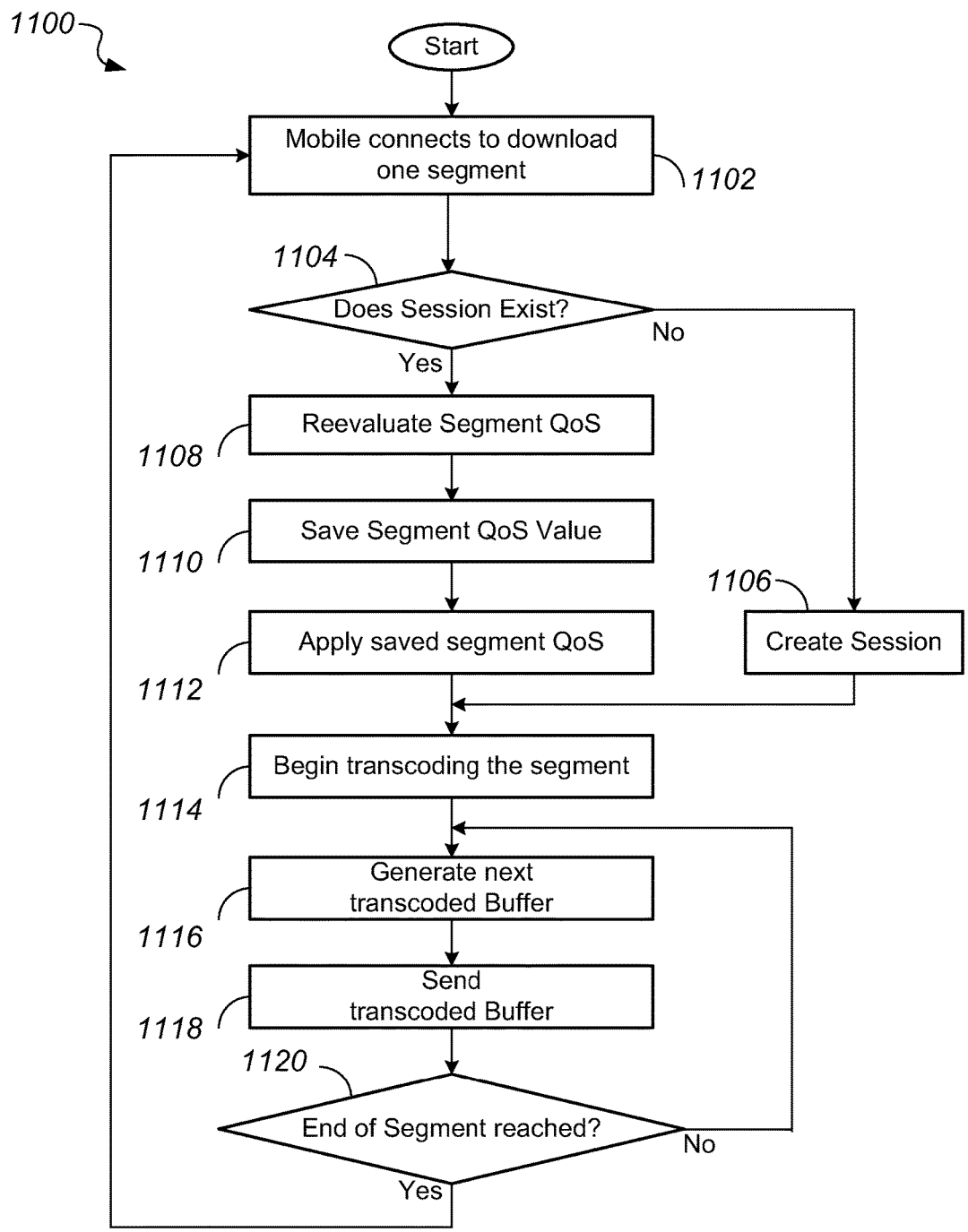
FIG. 11 shows a flowchart of a Modified Dynamic Bit Rate Adaptation Process 1100 according to another embodiment of the invention.

FIG. 11 shows a flowchart of a Modified Dynamic Bit Rate Adaptation Process 1100 according to another embodiment of the invention, comprising steps:
1102: "Mobile Connects to Download one Segment";
1104: "Does Session Exist?";
1106: "Create Session";
1108: "Reevaluate Segment QoS";
1110: "Save Segment QoS value".
1112: "Apply Saved Segment QoS";
1114: "Begin Transcoding the Segment";
1116: "Generate next transcoded Buffer"; (=404)
1118: "Send transcoded Buffer"; and (=406)
1120: "End of Segment reached?";

The Modified Dynamic Bit Rate Adaptation (MDBRA) Process 1100 comprises a loop including steps 1102 to 1120 which starts after the mobile unit has obtained a playlist of segments from the Media Processing Server 302 (FIG. 3). The MDBRA Process 1100 covers the transcoding and transmission of media segments upon requests issued by the mobile unit which connects to download segments as necessary. A transcoding session is created when the first connection is established, and is used for subsequent requests. The MDBRA Process 1100 ends when the mobile unit closes the connection with the server or aborts (not shown in FIG. 11). Starting with the second segment, the steps 1108 "Reevaluate Segment QoS" and 1110 "Save Segment QoS Value" are done after each new segment is requested, just before transcoding, because that is when the start interval of the current segment is known. At that time, the new QoS value (the encoding bit rate) can be computed as described in the step 1108 by multiplying the QoS value that was last saved (i.e. the previous time a segment was requested) with a QoS adjustment factor which is computed by dividing the duration of the last segment by the current segment start interval. In other words, the QoS value is saved every time it is calculated calculate, and readjusted every time another segment is requested by multiplying the saved value by the value calculated based on the last segment. That value provides a factor to apply to the initial bitrate of the segment before transcoding it. Since each segment request is a new connection for a segment file that has an (original) initial bitrate, it is necessary to remember from segment to segment what percentage of that initial bitrate to transcode at. That percentage is then adjusted every time a segment is requested.

In the step 1102 "Mobile Connects to Download one Segment", the mobile unit connects and requests one segment.

In the step 1104 "Does Session Exist?", it is determined if a transcoding session between the server and the mobile unit already exists. If it does (exit "Yes" from step 1104) execution continues with the step 1108, otherwise (exit "No" from step 1104) a transcoding session is created in the next step 1106.

In the step 1106 "Create Session", an initial transcoding bit rate (QoS=1.0) is established according to the profile of the mobile unit (configuration). Execution then continues with the step 1114.

In the step 1108 "Reevaluate Segment QoS", the saved QoS value that was used in transcoding the last completed segment is reevaluated, based on the time interval between this last completed segment and the previous segment. The step 1108 is expanded in more detail in FIG. 12 below.

In the step 1110 "Save Segment QoS value", the newly computed Segment QoS value is saved in preparation for transcoding the next segment.

In the step 1112 "Apply Saved Segment QoS", the newly saved QoS value is applied, i.e. sent to the Transcoder 314, analogous to the step 412 as described in detail in FIG. 10.

In the step 1114 "Begin Transcoding the Segment", transcoding of the current segment is begun. This step is analogous to the step 402.

The steps 1116 "Generate next transcoded Buffer" and 1118 "Send transcoded Buffer" of the MDBRA process 1100 are analogous to the steps 404 and 406 respectively of the DBRA process 400.

In the step 1120 "End of Segment reached?", it is determined if the end of the currently transmitted segment has been reached. If this is not the case (exit "No" from step 1120) execution loops back to the step 1116 for processing the next buffer, otherwise (exit "Yes" from step 1120) execution continues with the step 1102 to wait for the next segment to be requested by the mobile unit.

Figure 12:
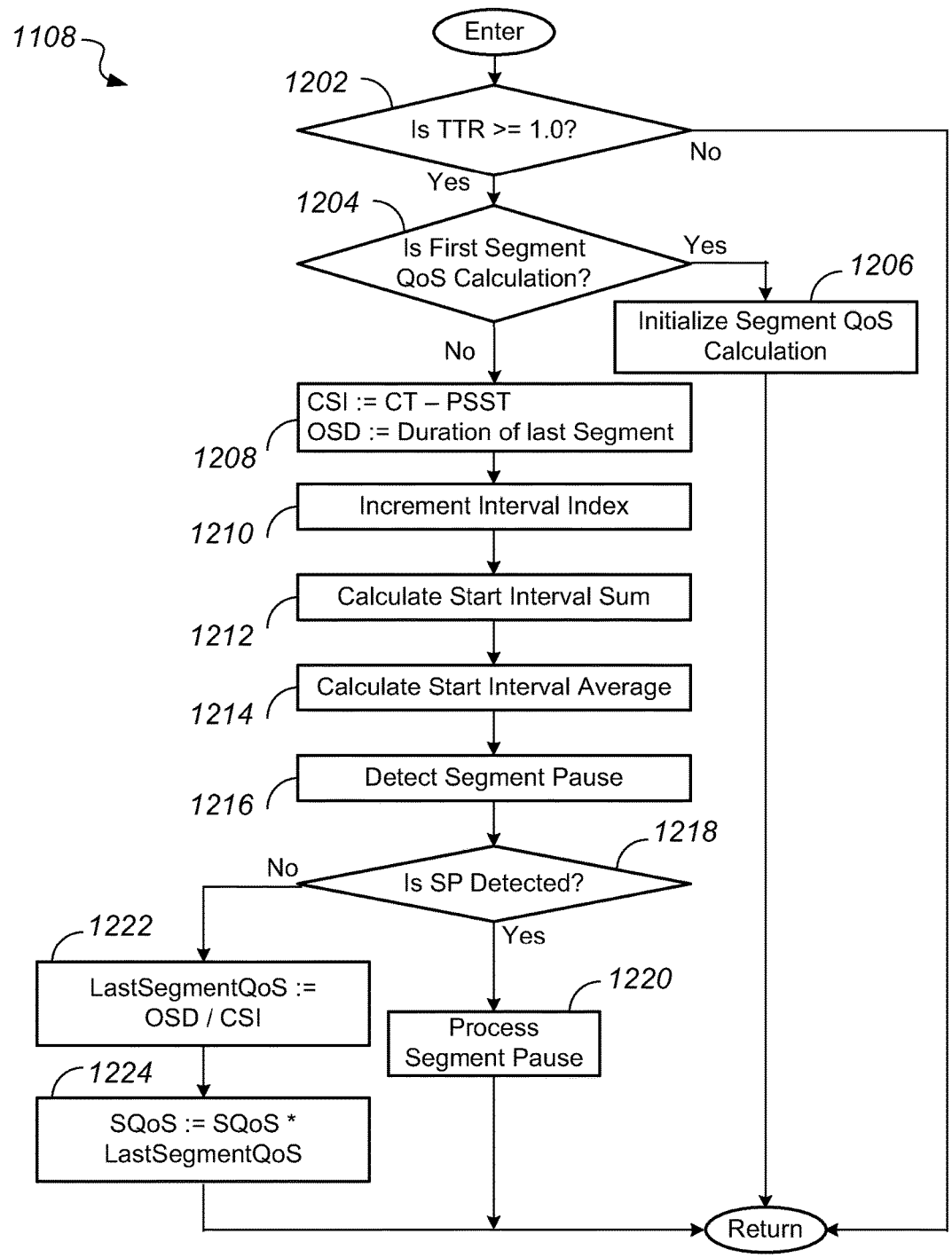
FIG. 12 is a more detailed flowchart of the Segment QoS reevaluation step 1108 of FIG. 11.

FIG. 12 is a more detailed flowchart of the Segment QoS Reevaluation step 1108 of FIG. 11, including steps:
1202: "Is TTR>=1.0?";
1204: "Is First Segment QoS Calculation?";
1206: "Initialize Segment QoS Calculation";
1208: "Calculate Current Start Interval (CSI) and Outputted Segment Duration (OSD)";
1210: "Increment Interval Index";
1212: "Calculate Start Interval Sum";
1214: "Calculate Start Interval Average";
1216: "Detect Segment Pause";
1218: "Is Segment Pause (SP) Detected?";
1220: "Process Segment Pause";
1222: "LastSegmentQoS:=OSD/CSI"; and
1224: "SQoS:=SQoS*LastSegmentQoS".

The Segment QoS Reevaluation step 1108 resembles the Reevaluate QoS step 408 of the DBRA Process of FIG. 4 (expanded in FIG. 5) with differences due to the use of segment Start Intervals and Outputted Segment Duration values in place of Clock Intervals and Buffer Intervals respectively.

In the step 1202 "Is TTR>=1.0?", it is determined whether the current TranscodingThrottlingRate is equal or greater than 1.0. If it is (exit Yes from step 1202), execution continues with the next step 1204, otherwise (exit No from step 1202) transcoding to reduce the bit rate is not required and the procedure returns.

In the step 1204 "Is First Segment QoS Calculation?", it is determined whether this is the first QoS evaluation for a segment. The Segment QoS is different compared to the simple QoS of FIG. 5 because the Segment QoS determines the transcoder bit rate for an entire segment, not just a transcoder buffer transmission. If this is the First Segment QoS Calculation (exit Yes from step 1204) execution continues with the step 1206 "Initialize Segment QoS Calculation", expanded below in FIG. 13. If this is not the First Segment QoS Calculation (exit No from step 1204) execution continues with the step 1208.

In the step 1208 "Calculate Current Start Interval (CSI) and Outputted Segment Duration (OSD)" the Current Start Interval and the Outputted Segment Duration are calculated as follows:

CSI:=CT−PSST, where CT is the Current Time and
PSST is the PreviousSegmentStartTime;
and OSD:=Duration of the last outputted segment.

The step 1208 is somewhat similar to the step 510 of FIG. 5, but relying only on start time (current start interval) and duration (display time) of the last segment as provided by timestamps embedded in transcoded media fragments of the last segment.

In the step 1210 "Increment Interval Index", the current interval index (CII) is incremented. The interval index is increased every time the QoS is recalculated. It is used as a divisor when calculating interval averages. The step 1210 is identical to the step 514 of FIG. 5.

In the step 1212 "Calculate Start Interval Sum", the StartIntervalSum (SIS) is incremented by the CurrentStartInterval. The step 1212 is similar to the step 516 of FIG. 5, but provides summing of Start Intervals (CSI) instead of Clock Intervals (CCI).

In the step 1214 "Calculate Start Interval Average", the StartIntervalAverage (SIA) is calculated by dividing the StartIntervalSum by the IntervalIndex. The step 1214 is similar to the step 518 of FIG. 5, but provides averaging of Start Intervals instead of Clock Intervals.

The step 1216 "Detect Segment Pause" is analogous to the step 520 "Detect Pause" of FIG. 5, but instead of CCI and CIA, uses CSI and SIA variables respectively to determine the Boolean value of PauseDetected.

The step 1218 "Is Segment Pause (SP) Detected?" is analogous to the step 522 "Detect Pause" of FIG. 5. In the step 1218 the result of the previous step 1216 is used to determine if the user has probably paused the media. A Segment Pause would be detected when a segment is requested and it is realized that it has been a long time since the last segment was requested. If a segment pause was detected (exit Yes from step 1218) the segment pause is processed in the next step 1220, otherwise (exit No from step 1218) execution continues with the step 1222.

The step 1220 "Process Segment Pause" is analogous to the step 524 "Process Pause" of FIG. 5, and is mainly a corrective recalculation of the segment start interval sum (instead of the clock interval sum in step 524, see FIG. 8) after an abnormally long segment interval has led to the detection of a user pause.

In the step 1222 "LastSegmentQoS:=OSD/CSI" a variable "LastSegmentQoS" which is the QoS adjustment factor (corresponding to a relative bit rate) that was used in transcoding the last segment, is calculated by dividing the duration of the last outputted segment (OSD), i.e. the estimated display time of the last segment, by the Current Start Interval, i.e. the estimated transmit time of the last segment.

In the step 1224 "SegmentQoS(SQoS):= SQoS*LastSegmentQoS", the LastSegmentQoS is multiplied by the current Segment QoS to arrive at the Segment QoS to be used in transcoding the next segment. After the step 1224, the Segment QoS Reevaluation process 1108 is finished and the newly computed SegmentQoS value is saved (in step 1110, FIG. 11).

Figure 13:
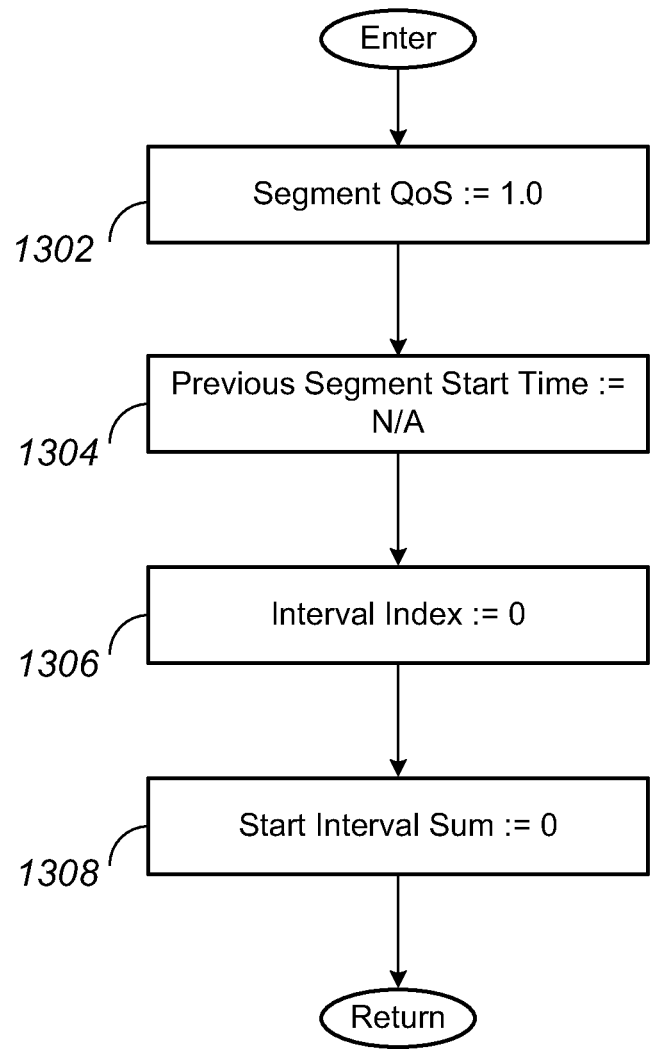
FIG. 13 is a more detailed flowchart of the "Initialize Segment QoS Calculation" step 1206 of FIG. 12.

FIG. 13 is a more detailed flowchart of the "Initialize Segment QoS Calculation" step 1206 of FIG. 12, including steps:

1302: "Segment QoS:=1.0" for initializing the Segment QoS to 1.0;

1304: "Previous Segment Start Time:=N/A" for initializing the Previous Segment Start Time to a value of "Not Available" (N/A) because no previous segment exists yet.

1306: Interval Index:=0" for initializing the Interval Index to 0; and

1308: "Start Interval Sum:=0" for initializing the Start Interval Sum to 0.

The purpose of the step 1206 is analogous to that of the step 508 of FIG. 5, for initializing variables before the first segment is transcoded.

Methods and a system to provide bandwidth adaptation of media files for transmission over connections with varying bandwidth are provided by embodiments of the present invention, thus improving the user experience in HTTP multimedia delivery over networks for which the bandwidth varies over time.

Protocols for streaming media files over a network, other than HTTP, are within the scope of the invention. Such protocols need not provide application level feed back from the mobile unit to the dynamic bit rate adapter, but are assumed to provide a reliable transport mechanism.

Additional parameters or methods for detecting pauses may also be contemplated, and developed based on theoretical considerations or purely experimentally. Such refinements are considered as within the scope of the present disclosure.

In the embodiments of the invention, the Transcoder 314 comprises software having computer readable instructions stored in a memory for execution by a processor, but alternatively the Transcoder 314 may also be implemented as hardware on a separate processor, such as co-processor, in a digital signal processor (DSP) chip or in an Application Specific Integrated Circuit (ASIC).

Although specific embodiments of the invention have been described in detail, it should be understood that the described embodiments are illustrative and not restrictive. Various changes and modifications of the embodiments may be made within the scope of the following claims without departing from the scope of the invention in its broader aspect.

What is claimed is:

1. A method for encoding a media file or part thereof for transmission in real time over a varying bandwidth link to a mobile unit, comprising:
   employing at least one processor of a transcoder for:
   (i) encoding one or more fragments of the media file into transcoded media fragments to form a stream fragment;
   (ii) sending the stream fragment to a transmission buffer of the transcoder;
   (iii) determining an estimated transmit time of a previously formed stream fragment, the estimated transmit time being a time interval required for said previously formed stream fragment to be conveyed from the transmission buffer and consumed by the varying bandwidth link;
   (iv) determining an estimated display time of said stream fragment at the mobile unit; and
   (v) adjusting a current encoding rate of the transcoded media fragments as a function of the estimated transmit time and the estimated display time.

2. The method of claim 1, wherein the step (i) comprises:
   encoding at least a first fragment of the media file into corresponding first transcoded media fragment at an initial encoding rate;
   setting the current encoding rate equal to the initial encoding rate; and
   the step (v) comprises encoding subsequent fragments of the media file into corresponding transcoded media fragments at the adjusted current encoding rate.

3. The method of claim 1, wherein the step (v) comprises determining the function depending on the current encoding rate and an adjustment factor determined based on the estimated display time and the estimated transmit time.

4. The method of claim 3, wherein the step (iv) comprises deriving the estimated display time from timestamps associated with previously formed stream fragments.

5. The method of claim 1, wherein the step (v) further comprises adjusting the current encoding rate as a function of the current encoding rate.

6. The method of claim 1, wherein the step (iv) further comprises determining a current buffer interval representing the estimated display time of a last stream fragment at the mobile unit, the current buffer interval being derived from timestamps embedded in at least some of the transcoded media fragments of the last stream and a previous stream fragment.

7. The method of claim 6, further comprising:
   determining a current clock interval between a current time and a previous time of a last encoding;
   comparing the current clock interval with the current buffer interval; and
   modifying the current encoding rate provided the current clock interval differs from the current buffer interval.

8. The method of claim 1, wherein the step (iii) further comprises determining the estimated transmit time as a current clock interval between a current time and a previous time of a last encoding.

9. The method of claim 1, wherein the step (v) comprises adjusting the current encoding rate only if a pause in the transmission of the transcoded media fragments is not detected.

10. The method of claim 9, wherein the step (v) further comprises detecting the pause, comprising:
    computing a clock interval average as an average of past current clock intervals since the encoding of the media file has begun, a current clock interval being measured between a current time and a previous time of a last encoding; and
    determining that the pause is detected provided the current clock interval exceeds the clock interval average by a predetermined margin.

11. A media processing system for encoding a media file or part thereof for transmission in real time over a varying bandwidth link to a mobile unit, comprising:
    a processor and a non-transitory computer readable storage medium having computer readable instructions stored thereon for execution by the processor, causing the processor to:
    transcode one or more fragments of the media file into transcoded media fragments to form a stream fragment;
    convey the stream fragment to the varying bandwidth link; and adjust a current encoding bit rate of the transcoder as a function of:
  (i) an estimated transmit time of a previously formed stream fragment, the estimated transmit time being a time interval required for the previously formed media fragment to be conveyed from the transmission buffer and consumed by the varying bandwidth link; and
  (ii) an estimated display time of the stream fragment at the mobile unit.

12. The media processing system of claim 11, wherein the computer readable instructions further cause the processor to:
  encode at least a first fragment of the media file into corresponding first transcoded media fragment at an initial encoding rate;
  set the current encoding rate equal to the initial encoding rate; and
  encoding subsequent fragments of the media file into corresponding transcoded media fragments at the adjusted current encoding rate.

13. The media processing system of claim 11, wherein the computer readable instructions further cause the processor to determine the function depending on the current encoding rate and an adjustment factor determined based on the estimated display time and the estimated transmit time.

14. The media processing system of claim 11, wherein the computer readable instructions further cause the processor to derive the estimated display time from timestamps associated with previously formed stream fragments.

15. The media processing system of claim 11, wherein the computer readable instructions further cause the processor to adjust the current encoding rate as a function of the current encoding rate.

16. The media processing system of claim 11, wherein the computer readable instructions further cause the processor to further determine a current buffer interval representing the estimated display time of a last stream fragment at the mobile unit, the current buffer interval being derived from timestamps embedded in at least some of the transcoded media fragments of the last stream and a previous stream fragment.

17. The media processing system of claim 16, wherein the computer readable instructions further cause the processor to:
  determine a current clock interval between a current time and a previous time of a last encoding;
  compare the current clock interval with the current buffer interval; and
  modify the current encoding rate provided the current clock interval differs from the current buffer interval.

18. The media processing system of claim 11, wherein the computer readable instructions further cause the processor to determine the estimated transmit time as a current clock interval between a current time and a previous time of a last encoding.

19. The media processing system of claim 11, wherein the computer readable instructions further cause the processor to adjust the current encoding rate only if a pause in the transmission of the transcoded media fragments is not detected.

20. The media processing system of claim 19, wherein the computer readable instructions further cause the processor to detect the pause, comprising:
  computing a clock interval average as an average of past current clock intervals since the encoding of the media file has begun, a current clock interval being measured between a current time and a previous time of a last encoding; and
  determining that the pause is detected provided the current clock interval exceeds the clock interval average by a predetermined margin.

* * * * *